(12) United States Patent
Maxwell et al.

(10) Patent No.: US 8,233,712 B2
(45) Date of Patent: Jul. 31, 2012

(54) METHODS OF SEGMENTING A DIGITAL IMAGE

(75) Inventors: Travis Linden Maxwell, Greely (CA); Yun Zhang, Fredericton (CA)

(73) Assignee: University of New Brunswick, Fredericton, NB (CA)

( * ) Notice: Subject to any disclaimer, the term of this patent is extended or adjusted under 35 U.S.C. 154(b) by 1350 days.

(21) Appl. No.: 11/656,950

(22) Filed: Jan. 24, 2007

(65) Prior Publication Data

US 2010/0272357 A1    Oct. 28, 2010

Related U.S. Application Data

(60) Provisional application No. 60/833,770, filed on Jul. 28, 2006.

(51) Int. Cl.
*G06K 9/34* (2006.01)
*G06K 9/36* (2006.01)
*G06K 9/00* (2006.01)

(52) U.S. Cl. .......................... 382/173; 382/277

(58) Field of Classification Search .................. 382/128, 382/164, 168, 170, 173, 224, 225, 228, 256, 382/257, 259, 275–277, 294, 308, 254; 358/1.9, 358/2.1, 3.22, 3.27, 462; 348/169; 375/419, 375/473, 582; 705/14.49; 706/8, 14, 52, 706/900; 600/443, 459, 463
See application file for complete search history.

(56) References Cited

U.S. PATENT DOCUMENTS

| | | | |
|---|---|---|---|
| 5,845,004 A * | 12/1998 | Banjanin et al. | 382/128 |
| 5,893,095 A | 4/1999 | Jain et al. | |
| 5,911,139 A | 6/1999 | Jain et al. | |
| 6,014,473 A * | 1/2000 | Hossack et al. | 382/294 |
| 6,078,697 A * | 6/2000 | Ng | 382/275 |
| 6,151,424 A | 11/2000 | Hsu | |
| 6,175,655 B1 * | 1/2001 | George et al. | 382/257 |
| 6,404,920 B1 | 6/2002 | Hsu | |
| 6,625,308 B1 * | 9/2003 | Acharya et al. | 382/168 |
| 6,625,315 B2 * | 9/2003 | Laumeyer et al. | 382/190 |
| 6,654,681 B1 | 11/2003 | Kiendl et al. | |
| 6,658,399 B1 * | 12/2003 | Acharya et al. | 706/52 |
| 6,738,513 B1 | 5/2004 | Binnig et al. | |
| 6,832,002 B2 | 12/2004 | Baatz et al. | |
| 7,079,281 B1 * | 7/2006 | Ng et al. | 358/1.9 |
| 7,117,131 B2 | 10/2006 | Binnig | |
| 7,146,380 B2 | 12/2006 | Schaepe et al. | |

(Continued)

OTHER PUBLICATIONS

Aplin, P., P.M. Atkinson, and P.J. Curran (1999). "Fine Spatial Resolution Simulated Satellite Sensor Imagery for Land Cover Mapping in the United Kingdom." Remote Sensing of Environment, vol. 68, No. 3, pp. 206-216. [Internet], cited Oct. 20, 2004. Available in .pdf format through http://www.unb.ca/eresources/e-Journals.php.

(Continued)

*Primary Examiner* — Amir Alavi

(74) *Attorney, Agent, or Firm* — Eugene F. Derényi; Fogler, Rubinoff LLP

(57) ABSTRACT

A method of segmenting a digital image comprising the steps of performing a preliminary segmentation of the image into sub objects, defining a model object by selecting sub objects that define the model object, providing sub-object and model object features, using a fuzzy logic inference system to calculate segmentation parameters based on at least one of the sub object and model object features, and performing segmentation of the image using the segmentation parameters.

22 Claims, 8 Drawing Sheets

U.S. PATENT DOCUMENTS

| | | | |
|---|---|---|---|
| 7,274,810 B2* | 9/2007 | Reeves et al. | 382/128 |
| 7,437,004 B2 | 10/2008 | Baatz et al. | |
| 7,467,159 B2 | 12/2008 | Schaepe et al. | |
| 7,483,573 B2 | 1/2009 | Lohweg | |
| 7,489,825 B2* | 2/2009 | Sirohey et al. | 382/244 |
| 7,523,079 B2 | 4/2009 | Athelogou et al. | |
| 7,523,115 B2 | 4/2009 | Schmidt et al. | |
| 7,523,414 B2 | 4/2009 | Schmidt et al. | |
| 7,574,053 B2 | 8/2009 | Baatz et al. | |
| 2004/0095352 A1* | 5/2004 | Huang | 345/473 |
| 2005/0111757 A1* | 5/2005 | Brackett et al. | 382/294 |
| 2006/0026111 A1 | 2/2006 | Athelogou et al. | |
| 2006/0050995 A1 | 3/2006 | Lohweg | |
| 2006/0195407 A1 | 8/2006 | Athelogou et al. | |
| 2007/0036440 A1 | 2/2007 | Schaepe et al. | |
| 2007/0112823 A1 | 5/2007 | Baatz et al. | |
| 2007/0122017 A1 | 5/2007 | Binnig et al. | |
| 2008/0008349 A1 | 1/2008 | Binnig et al. | |
| 2008/1037937 | 6/2008 | Athelogou et al. | |
| 2008/0292153 A1 | 11/2008 | Binnig et al. | |

OTHER PUBLICATIONS

Baatz, M. and A. Schape (1999). "Object-Oriented and Multi-Scale Image Analysis in Semantic Networks." Proceedings of the 2nd International Symposium on Operationalization of Remote Sensing, ITC, NL, Aug. 16-20. [Internet], cited Jul. 2, 2004. Available in .pdf format through http://www.definiens-imaging.com/ documents/reference.htm.

Baatz, M. and A. Schape (2000). "Multiresolution Segmentation—An Optimization Approach for High Quality Multi-Scale Image Segmentation." Angewandte Geographische Informationsverarbeitung XII, Ed. J. Strobl et al. AGIT Symposium, Salzburg, Germany, 2000. pp. 12-23. [Internet], cited Jul. 2, 2004. Available in .pdf format through http://www.definiens-imaging.com/documents/reference.htm.

Bauer, T. and K. Steinnocher (2001). "Per-parcel land use classification in urban areas applying a rule-based technique." Geobit/GIS. vol. 6, pp. 24-27. [Internet], cited Aug. 24, 2004. Available in .pdf format through http://www.definiens-imaging.com/documents /reference.htm.

Blaschke T. and J. Strobl (2001). "What's Wrong with Pixels? Some Recent Developments Interfacing Remote Sensing and GIS." GeoBIT/GIS, vol. 6, pp. 12-17. [Internet], cited Aug. 24, 2004. Available in .pdf format through http://www.definiens-imaging.com/documents/reference.htm.

Burnett, C. and T. Blaschke (2003). "A Multi-Scale Segmentation/Object Relationship Modelling Methodology for Landscape Analysis." Ecological Modelling, vol. 168, pp. 233-249. [Internet], cited Jun. 4, 2004. Available in .pdf format through http://www.unb.ca/eresources/e-Journals.php.

Carleer, A., O. Debeir, and E. Wolff (2004). "Comparison of Very High Spatial Resolution Satellite Image Segmentations." Proceedings of SPIE: Image and Signal Processing for Remote Sensing IX, Ed. L. Bruzzone. Barcelona, Spain, 2004. SPIE vol. 5238, Bellingham, Washington, pp. 532-542.

Cheng, P., T. Toutin, and Y. Zhang (2003). " QuickBird-Geometric Correction, Data Fusion, and Automatic DEM Extraction" Technical Papers. [Internet], cited Oct. 30, 2004. Available in .pdf format through http://www.pcigeomatica.com/support_ center /tech_papers/techpapers_main.php.

Congalton, R.G., and K. Green (1999). Assessing the Accuracy of Remotely Sensed Data: Principles and Practices. Lewis Publishers, NY., cover and copyright pages.

Cushnie, J.L. (1987). "The Interactive Effect of Spatial Resolution and Degree of Internal Variability Within Land-cover Types on Classification Accuracies." International Journal of Remote Sensing, vol. 8, No. 1, pp. 15-29.

Davis, C.H. and X. Wang (2002). "Urban Land Cover Classification from High Resolution Multi-Spectral IKONOS Imagery." Proceedings of IGARSS 2002 IEEE. Institute of Electrical and Electronic Engineers Inc, Toronto, Canada, Jul. 2003. University of Waterloo. [Internet], cited Jun. 4, 2004. Available in .pdf format through http://www.definiens-imaging.com/documents/reference.htm.

Darwish, A., K. Leukert, and W. Reinhardt (2003). "Image Segmentation for the Purpose of Object-Based Classification " Proceedings of IGARSS 2002 IEEE. Institute of Electrical and Electronic Engineers Inc, Toulouse, France, Jul. 2003. University of Bundeswehr, Munich, Germany. [Internet], cited Jun. 4, 2004. Available in .pdf format through http://www.definiens-imaging.com/documents/reference.htm.

De Kok, R, T. Schneider, and U. Ammer (1999). "Object-based classification and Applications I the alpine forest environment." Proceedings of the International Archives of Photogrammetry and Remote Sensing, vol. 32, Part 7-4-3. Valladolid, Spain, Jun. 3-4, 1999. [Internet], cited Feb. 22, 2005. Available in .pdf format through http://www.definiens-imaging.com/documents/reference.htm.

De Kok, R., A. Buck, T. Schneider, and U. Ammer (2000). "Analysis of Image Objects from VHR Imagery for Forest GIS Updating in the Bavarian Alps." ISPRS, vol. XXXIII. Amsterdam, 2000. [Internet], cited Aug. 24, 2004. Available in .pdf format through http://www.definiens-imaging.com/documents /reference.htm.

Definiens Imaging GmbH (2004a). Whitepaper—eCognition Professional 4.0. Definiens Imaging, GmbH, Munich, Germany. [Internet], cited May 30, 2004. Available in .pdf format through http://www.definiens-imaging.com/documents/brochures.htm.

Definiens Imaging GmbH (2004b). eCognition User Guide 4. Definiens Imaging, GmbH, Munich, Germany.

DigitalGlobe (2004). "QuickBird Specifications." [Internet], cited Aug. 18, 2004. Available at http://www.digitalglobe.com/about/QuickBird.html.

DigitalGlobe (2005). "General Questions." [Internet], cited Jan. 27, 2005. Available at http://www.digitalglobe.com/about/Faq.shtml#q3.

Ehlers, M., R. Janowsky, M. Gohler (2003). "Ultra High Resolution Remote Sensing for Environmental Monitoring." Earth Observation Magazine [Internet], (Dec. 2003), cited Jan. 20, 2005. Available at www.eomonline.com/Archives/ Dec03/Ehlers.html.

Flack, J. (1996). Interpretation of Remotely Sensed Data using Guided Techniques. Ph.D. thesis, School of Computer Science, Curtin University of Technology, Western Australia.

Flanders, D., M. Hall-Beyer, J. Pereverzoff (2003). "Preliminary evaluation of eCognition object-based software for cut block delineation and feature extraction." Canadian Journal of Remote Sensing, vol. 29, No. 4, pp. 441-452. [Internet], cited Jun. 4, 2004. Available in .pdf format through http://www.unb.ca/eresources/e-Journals.php.

Frauman, E. and E. Wolff (2005). "Segmentation of very high spatial resolution satellite images in urban areas for segments-based classification." Human Settlements and Impact Analyisis, Proceedings of the ISPRS Working Group VII. Tempe, AZ, USA, Mar. 14-16, 2005. [Internet], cited May 1, 2005. Available in .pdf format through http://www.definiens-imaging.com/documents/reference.htm.

Genderon, J.L. Van, and C. Pohl (1994). "Image fusion: Issues, Techniques, and Applications." Intelligent Image Fusion, Proceedings EARSeL Workshop, Eds. J.L. Van Genderon and V. Cappellini. Strasbourg, France, Sep. 11, 1994, pp. 18-26.

Gonzalez, R. and R. Woods (1992). Digital Image Processing. Addison-Wesley, Reading, MA.

Gonzalez, R. and R. Woods (2002). Digital Image Processing: Second Edition. Prentice-Hall, Inc., Upper Saddle River, NJ., cover and copyright pages.

Guindon, B (1997). "Computer-Based Aerial Image Understanding: A Review and Assessment of its Application to Planimetric Information Extraction from Very High Resolution Satellite Images." Canadian Journal of Remote Sensing, vol. 23, pp. 38-47. [Internet], cited Jan. 20, 2005. Available in .pdf format through http://www.ccrs.nrcan.gc.ca/ccrs/rd/apps/map/infoext_e.html.

Hay, G., T. Blaschke, D. Marceau, A. Bouchard (2003). "A Comparison of Three Image-Object Methods for the Multiscale Analysis of Landscape Structure." ISPRS Journal of Photogrammetry and Remote Sensing, vol. 57, No. 5-6, pp. 327-345. [Internet], cited Sep. 27, 2004. Available in .pdf format through http://www.unb.ca/eresources/e-Journals.php.

Hofmann, P. and W. Reinhardt (2000). "The Extraction of GIS Features from High Resolution Imagery using Advanced Methods based on Additional Contextural Information—First Experiences." International Archives of Photogrammetry and Remote Sensing. Amsterdam, 2000, pp. 51-58. [Internet], cited Aug. 24, 2004. Available in .pdf format through http://www.definiens-imaging.com/documents /reference.htm.

Hofmann, P (2001). "Detecting Urban Features from IKONOS Data using an Object-Oriented Approach." Proceedings of the First Annual Conference of the Remote Sensing & Photogrammetry Society. RSPS, Munich, Germany, Sep. 12-14, 2001, pp. 79-91. [Internet], cited Aug. 24, 2004. Available in .pdf format through http://www.definiens-imaging.com/documents /reference.htm.

Huiping, H., W. Bingfang, and F. Jinlong (2003). "Analysis to the Relationship of Classification Accuracy, Segmentation Scale, Image Resolution." Proceedings of IGARSS 2003 IEEE. Institute of Electrical and Electronic Engineers Inc, Toulouse, France, Jul. 2003, pp. 3671-3673. [Internet], cited Aug. 24, 2004. Available in .pdf format through http://www.definiens-imaging.com/documents /reference.htm.

Janssen, L.L.F. and M. Molenaar (1995). "Terrain Objects, Their Dynamics and Their Monitoring by the Integration of GIS and Remote Sensing." IEEE Transactions on Geoscience and Remote Sensing, vol. 33, No. 3, pp. 749-758. [Internet], cited Oct. 20, 2004. Available in .pdf format through http://www.unb.ca/eresources/e-Journals.php.

Kaehler, S (1998). "Fuzzy Logic—An Introduction." [Internet], cited Oct. 12, 2004. Available at http://www.seattlerobotics.org/encoder/mar98/fuz/flindex.html.

Klir, G.J., U.H. St. Clair, and B. Yuan (1997). Fuzzy Set Theory: Foundations and Applications. Prentice-Hall Inc., Upper Saddle River, NJ., cover and copyright pages.

Latty, R.S. and R.M. Hoffer (1981). "Computer-Based Classification Accuracy Due to the Spatial Resolution Using Per-Point Versus Per-Field Classification Techniques." Symposium of Machine Processing of Remotely Sensed Data, pp. 384-392.

Lillesand, T. and R. Kiefer (1994). Remote Sensing and Image Interprestation. 3rd ed., John Wiley and Sons, Inc., New York., cover and copyright pages.

Marceau, D.J. (1999). "The Scale Issue in the Social and Natural Sciences." Canadian Journal of Remote Sensing. vol. 25, No. 4, pp. 347-356.

Marceau, D.J. and G.J. Hay (1999). "Remote Sensing Contributions to the Scale Issue." Canadian Journal of Remote Sensing. vol. 25, No. 4, pp. 357-366.

Markham, B.L. and J.R.G. Townshend (1981). "Land Cover Classification Accuracy as a Function of Sensor Spatial Resolution." Proceeding of the Fifteenth International Symposium on Remote Sensing of Environment, Ann Arbor, Michigan, pp. 1075-1090.

Matsuyama, T (1987). "Knowledge-Based Aerial Image Understanding Systems and Expert Systems for Image Processing", IEEE Transactions on Geoscience and Remote Sensing, vol. 25, pp. 305-316.

Meinel, G., M. Neubert, and J. Reder (2001). "The Potential Use of Very High Resolution Satellite Data for Urban Areas—First Experiences with IKONOS Data, their Classification and Application in Urban Planning and Environmental Monitoring." Proceedings of the 2nd Symposium on Remote Sensing of Urban Areas, Ed. C. Jurgens. Regensburg, Germany, pp. 196-205. [Internet], cited Aug. 24, 2004. Available in .pdf format through http://www.definiens-imaging.com/documents/reference.htm.

Munechika, C.K., J.S. Warnick, C. Salvaggio, and J.R. Schott (1993). "Resolution Enhancement of Multispectral Image Data to Improve Classification Accuracy." Photogrammetric Engineering and Remote Sensing, vol. 59, No. 1, pp. 67-72.

Neubert, M (2001). "Segment-based Analysis of High Resolution Satellite and Laser Scanning Data." Proceedings of the 15th International Symposium Informatics for Environmental Protection—Sustainability in the Information Society, Eds. L.M. Hilty and P.W. Gilgen. Marburg, Metropolis, Oct. 10-12, 2001, pp. 379-386. [Internet], cited Aug. 24, 2004. Available in .pdf format through http://www.definiens-imaging.com /documents/reference.htm.

Neubert, M. and G. Meinel (2003). "Evaluation of Segmentation Programs for High Resolution Remote Sensing Applications." Proceedings of the ISPRS Joint Workshop High Resolution Mapping from Space. Hannover, Germany, 2003. [Internet], cited Aug. 24, 2004. Available in .pdf format through http://www.definiens-imaging.com/documents /reference.htm.

Office of Science and Technology Policy (2005). "U.S. Commercial Remote Sensing Policy, Apr. 25, 2003: Fact Sheet." [Internet], cited Jan. 24, 2005. Available at http://www.ostp.gov/html/Fact%20 Sheet%20- %20Commercial%20Remote %20Sensing% 20 Policy %20-%20April%2025%202003.pdf.

Openshaw, S. and P.J. Taylor (1979). "A Million or So Correlation Coefficients: Three Experiments on the ModifiableAreal Unit Problem." Statistical Applications in the Spatial Sciences, pp. 127-144.

Orblmage (2005). "Orbimage Selected as NGA's Second NextView Provider." [Internet], cited Jan. 24, 2005. Available at http://www.orbimage.com/news/ releases/09-30A-04.html. Last accessed Oct. 5, 2010 at: http://www.aerospaceonline.com/article.mvc/Orbimage-Selected-as-NGAs-Second-NextView-Pro-0001.

Pohl, C. and J. L. Van Genderen (1998). "Multisensor Image Fusion in Remote Sensing: Concepts, Methods and Applications." International Journal of Remote Sensing, 1998, vol. 19, No. 5, pp. 823-854. [Internet], cited Oct. 21, 2004. Available in .pdf format through http://www.unb.ca/eresources/e-Journals.php.

Schiewe, J., L. Tufte, and M. Ehlers (2001). "Potential and Problems of Multi-Scale Segmentation Methods in Remote Sensing." GeoBIT/GIS, vol. 6, pp. 34-39. [Internet], cited Aug. 24, 2004. Available in . pdf format through http://www.definiens-imaging.com/documents/reference.htm.

Schiewe, J (2002). "Segmentation of High-Resolution Remotely Sensed Data—Concepts, Applications, and Problems." Joint International Symposium on Geospatial Theory, Processing, and Applications. Ottawa, Canada. [Internet], cited Aug. 24, 2004. Available in . pdf format through http://www.definiens-imaging.com/documents /reference.htm.

Shackelford, A. and C. Davis (2003). "A fuzzy classification approach for high-resolution multispectral data over urban areas." IEEE Transactions of Geoscience and Remote Sensing. vol. 41, No. 9, pp. 1920-1932.. [Internet], cited Oct. 21, 2004. Available in .pdf format through http://www.unb.ca/eresources/e-Journals.php.

Space Imaging (2004). "IKONOS." [Internet], cited Aug. 18, 2004. Available at http://www.spaceimaging.com/products/ikonos/index_2.htm.

The Mathworks (2005). "Fuzzy Logic Toolbox—for use with MATLAB." [Internet], cited Apr. 15, 2005. Available in .pdf format through http://www.mathworks.com/access /helpdesk/help/pdf_doc/fuzzy/fuzzy.pdf.

Wong T.H., S.B. Mansor, M.R. Mispan, N. Ahmad, and W.N.A Sulaiman (2003). "Feature Extraction Based on Object Oriented Analysis." Proceedings of ATC 2003 Conference, Malaysia, 2004. [Internet], cited Aug. 24, 2004. Available in .pdf format through http://www.definiens-imaging.com/documents/reference.htm.

Zhang, Y.J. (1996). "A Survey on Evaluation Methods for Image Segmentation." Pattern Recognition. vol. 29, No. 8, pp. 1335-1346. [Internet], cited Oct. 15, 2004. Available in .pdf format through http://www.unb.ca/e-resources/eJournals.php.

Zhang, Y.J. (1997). "Evaluation and Comparison of Different Segmentation Algorithms." Pattern Recognition Letters. vol. 18, No. 10, pp. 963-974. [Internet], cited Oct. 21, 2004. Available in .pdf format through http://www.unb.ca/eresources/e-Journals.php.

Zhang, Y. (2002). "A New Automatic Approach for Effectively Fusing Landsat 7 Images and IKONOS Images." Proceedings of IGARSS 2002 IEEE. Toronto, Canada, Jun. 24-28, 2002. [Internet], cited Jun. 4, 2004. Available in .pdf format through http://www.unb.ca/eresources/e-Journals.php.

Barnes, S (2003). "Remote Sensing Unleashed." Geospatial Solutions [Internet], (Jun. 1, 2003), cited Jan. 21, 2005. Available at http://www.geospatial-online.com/ geospatialsolutions/issue/issueDetail.jsp? id=2325.

Fuhr, J.N (2004). "Geoint Visionary." Military Geospatial Technology Online Edition, vol. 2, No. 3, pp. 17-19. [Internet], cited Jan. 24, 2005. Available in .pdf format through http://www.mgt-kmi.com/archive_article.cfm? DocID=628.

Guobin, Z., B. Fuling, and Z. Mu (2003). "A Flexible Method for Urban Vegetation Cover Measurement based on Remote Sensing Images." Proceedings of the ISPRS Joint Workshop High Resolution Mapping from Space. Hannover, Germany, 2003. [Internet], cited Aug. 20, 2004. Available in .pdf format through http://www.definiens-imaging.com/documents /reference.htm.

National Geospatial-Intelligence Agency. "NGA Awards NextView Second Vendor Agreement." [Internet], cited Jan. 20, 2005. Available at http://www.nga.mil/ NGASiteContent/StaticFiles/OCR/NextView20040930.pdf.

Zhang, Y. (2001). "Texture-Integrated Classification of Urban Treed Areas in High-Resolution Color-Infrared Imagery." Photogrammetric Engineering and Remote Sensing, vol. 67, No. 12, pp. 1359-1365.

* cited by examiner

METHODS OF SEGMENTING A DIGITAL IMAGE

CROSS-REFERENCE TO RELATED APPLICATIONS

This application claims priority from U.S. Provisional Application No. 60/833,770 filed on Jul. 28, 2006 entitled METHOD OF SUPERVISED SEGMENTATION.

MICROFICHE APPENDIX

Not applicable.

TECHNICAL FIELD

This application relates to image processing and image segmentation for object-oriented classification in particular.

BACKGROUND OF THE INVENTION

Launched in September 1999, Space Imaging's IKONOS satellite ushered in the modern era of very high spatial resolution (VHR) earth observation. Demonstrating the capability to capture one meter panchromatic and four meter multispectral imagery, this achievement quickly had far reaching effects through a broad spectrum of applications. Today, IKONOS is only one of a growing number of VHR spaceborne sensors including DigitalGlobe's QuickBird and OrbImage's OrbView-3. Through the emergent collection of orbital platforms providing competition and keeping prices reasonable, VHR satellite imagery has seen widespread use by government, industry, and scientific communities. However, limitations on their application also persist as processing techniques endeavor to keep pace with the rapid improvement of sensor technology.

Next generation sensors will have the capability to collect at least 0.5 meter panchromatic and 2.0 meter multispectral imagery. Scheduled for orbit within the next two years, DigitalGlobe's next generation WorldView satellite and OrbImage's OrbView-5 satellite are two examples of this capability [DigitalGlobe, 2005; OrbImage, 2005]. Together, these sensors demonstrate the technological innovation that will continue to challenge the automated processing of high spatial resolution imagery into the foreseeable future.

Image analysis conducted by the human analyst is quickly becoming less viable given the quantity and currency requirements of data being managed in today's geographic information systems (GISs). Increasingly important are accurate automatic methods for information extraction. In particular, automatic land cover classification of satellite imagery is considered fundamental and critical to the information extraction problem [Swiewe et al., 2001; Huiping et al., 2003]. To a large degree, problems encountered using automatic per-pixel land cover classification techniques are a result of the trend toward higher spatial resolution sensors. These problems are well documented in literature [see Aplin et al., 1999; Schiewe et al., 2001; Schiewe, 2002; Huiping et al., 2003; Carleer et al., 2005; Frauman and Wolff, 2005].

In general, the intent of classification "is to replace visual analysis of the image data with quantitative techniques for automating the identification of features in a scene" [Lillesand and Kiefer, 1994]. This task is often carried out through the use of pixel-based classification techniques that rely on the spectral pattern of individual pixels to label them with the appropriate land cover class in a supervised or unsupervised manner. Supervised classification relies on the analyst training the classification system through the choice of representative pixels for each land cover type. Unsupervised classification statistically groups spectrally similar pixels in clusters that the user must then identify and label as representing a particular land cover class. Both methods see wide use today.

The trend toward higher spatial resolution sensors is challenging these traditional methods for a number of reasons. First, pixels in VHR imagery represent individual components of land cover objects and often these components exhibit varying degrees of reflectance [Baschke and Strobl, 2001; Ehlers et al., 2003]. As an example, modern sensors are able to detect individual objects on a rooftop such as skylights, heating and cooling units, shadows, and different building materials. Each object has its own characteristic reflectance and the result is a high degree of texture within a specific land cover class. This complicates classification based solely on pixel spectral properties.

Secondly, VHR data has a characteristically high panchromatic spatial resolution and significantly lower resolution in the multispectral bands. This lack of detail in colour imagery has led to the development of a number of new image fusion algorithms that combine these images to produce a higher resolution result [Genderen and Pohl, 1994; Pohl and Genderen, 1998]. The advancements achieved in this area are remarkable and it is reasonable to expect that research into new pan-sharpening techniques will continue so long as resolutions differ between panchromatic and multispectral data sets. However, the application of pan-sharpened data to the classification task is relatively unproven.

Thirdly, there exists an unavoidable trade-off between spatial and spectral resolution of a space-borne sensor. As the sensor's instantaneous field of view (IFOV) decreases, the spectral resolution is limited owing to the requirement to maintain an adequate signal to noise ratio. The result is the relatively weak spectral resolution that is characteristic of current VHR sensors [Munechika et al., 1993; Carleer et al., 2004]. Combined, pixel variability from original or pan-sharpened data sets and weak spectral resolution make per-pixel classification methods increasingly inadequate as the spatial resolution continues to improve into the next generation of sensors.

To permit automated processing of imagery captured by modern sensors, new methods are being developed to intelligently manage these attributes. Emphasizing the need to take advantage of information beyond that provided in the spectral domain by arbitrarily defined pixels, these new methods use spatial pattern recognition techniques to augment spectral-based classification procedures. Object-oriented classification shows promise in this regard.

The arbitrary spatial units that form an image are a direct consequence of the sensor's IFOV. The pixels are arbitrary in the sense that they are characteristic to the sensor and have no relationship to the scene content or topology. For remotely sensed imagery, this trait represents a specific case of the Modifiable Areal Unit Problem (MAUP) whereby there exists a vast number of combinations through which an image can be divided and analyzed [Openshaw and Taylor, 1979; Marceau, 1999; Marceau and Hay, 1999, Hay et al., 2003]. Although a number of solutions to this problem have been proposed, the use of pixels grouped into meaningful image objects "represents the clearest way out of MAUP, as an analyst works with spatially discrete entities rather than arbitrarily defined areal units" [Hay et al., 2003]. In this way, meaningful topological objects exhibit characteristic texture, shape and contextual features, which can be used to augment spectral features and result in a better overall classification.

Object-oriented classification, therefore, is an approach aimed at solving the problems encountered using per-pixel classification methods on VHR imagery [Definiens Imaging GmbH, 2004a]. Generally, two steps are needed in object-oriented classification: (1) segmentation, and (2) classification. Segmentation involves partitioning the image into contiguous groups of pixels called objects. Ideally, these objects correspond to real world objects of interest [Hofmann and Reinhardt, 2000]. Once the objects have been identified within the image, the second step commences with the classification of these objects based on spectral, textural, size, shape, and contextual features. In the end, the use of successfully segmented images may lead to improved classification accuracy when compared to pixel-based classification methods [Janssen and Molenaar, 1995; Aplin et al., 1999; Carleer et al. 2004].

Pan-sharpening as a pre-processing technique used to condition data prior to classification has seen increased use in recent years [see Bauer and Steinnocher, 2001; Meinel et al., 2001; Neubert, 2001; Davis and Wang, 2002; Shackelford and Davis, 2003]. In fact, Hofmann goes so far as to recommend pan-sharpening as a useful pre-processing step prior to classification using the object-oriented methodology. However, very limited literature was found that actually evaluates the effect of pan-sharpening on the classification accuracy of the result.

In the context of the MAUP, a number of studies examined the effect of resolution on classification accuracy using pixel-based techniques [see Latty and Hoffer, 1981; Markham and Townshend, 1981; Cushnie, 1987]. The general conclusion was that spatial resolution could have a significant effect on classification accuracy with a general trend toward lower accuracy with increasing pixel resolution [Marceau and Hay, 1999]. Consequently, pan-sharpened data cannot be directly compared to original data by means of pixel-based classification techniques. For this reason, an approach based on common object scales (degree of object abstraction) is much more appropriate for comparative purposes.

As object-oriented techniques continue to evolve, some problems persist in their implementation that limit their full potential from being realized. One of the major limitations is the concept of segmentation at optimal scales. Humans have a natural ability to perform this cognitive task through the grouping of pixels into meaningful objects. The difficulty arises when we try to define automatic techniques to perform this function. Deducing the optimal scales and selecting those scales that are most appropriate to form a classification hierarchy are key problems in the realization of the multi-scale object-based approach [Hay et al., 2003]. Further complicating this issue is the lack of a theory that indicates the sensitivity of classification results to the scale of analysis [Burnett and Blaschke, 2003]. These issues currently restrict the operationalization of this approach.

Of the segmentation approaches that have been developed and employ the multi-scale methodology, few are available commercially and even fewer provide convincing results. In fact, an empirical investigation conducted by Neubert and Meinel [2003] reported that eCognition, by Definiens Imaging GmbH, demonstrated the best overall results in a comparison with a number of other segmentation schemes. Employing the Fractal Net Evolution Approach (FNEA), eCognition has been successful in providing realistic and visually convincing image objects in a number studies and over a variety landscapes [see Blaschke and Strobl, 2001; Schiewe et al., 2001; Hay et al., 2003].

While successful in many respects, FNEA requires that the user define the segmentation parameters for each desired scale. The user must simultaneously consider spectral, shape, and textural features and conduct extensive experimentation in order to achieve the desired scale segmentation [Hay et al., 2003]. Frauman and Wolff [2005] attempted to establish a rule between object size and object scale to simplify the parameter selection problem, but even though a link has been established, the rule remains elusive. Therefore, the parameter selection problem continues to limit this technique.

"Image fusion is the combination of two or more different images to form a new image by using a certain algorithm" [Genderen and Pohl, 1994]. One type of image fusion involves the fusion of panchromatic and multispectral imagery acquired by VHR satellite sensors such as IKONOS or QuickBird. These techniques are particularly attractive since they allow the user to preserve the spatial detail characteristic of the panchromatic channel while retaining the spectral information of the original multispectral bands. The result is colour imagery with the same spatial resolution as the panchromatic image. The use of fine resolution pan-sharpened imagery in the place of coarser multispectral data is an attractive option for land cover classification and a technique that is seeing increased use as new image fusion algorithms are developed. However, there is little research that examines the applicability of this data to the classification problem.

For the purpose of classification, fusion techniques that maintain the radiometric characteristics of the imagery are of primary interest [Munechika et al., 1993]. Although pan-sharpening methods based on the separation of spectral and spatial components (ie. principal component analysis) have been used for classification, an examination of their classification suitability could not be found in literature. A visual evaluation of this category of techniques often presents a degree of colour distortion and raises the question of suitability in this regard. Munechika et al [1993] suggest that techniques "more statistically rigorous in its attempt to maintain radiometric fidelity" are required.

In 2003, the University of New Brunswick (UNB) filed a patent application for a new automatic fusion method called UNB Pan-Sharpening (U.S. patent application Ser. No. 10/345,932, publication no. 20040141659). By employing a least squares approach, this automatic method has produced convincing results as to the spectral integrity of fused VHR imagery [Zhang, 2002; Cheng et al, 2003]. To date, this method has been incorporated into PCI Geomatica as well as Digital Globe's production line. Given the recent success of this technique based on its visually convincing result and backed by the statistical rigor of least squares, this approach offers sound classification potential.

Through the use of pixel-based classification methods, it is very difficult to assess whether or not classification results using pan-sharpened imagery are superior to those using the original data set. This difficulty exists for four reasons: (1) different resolutions between original and pan-sharpened data sets, (2) uncertainty of spectral integrity, (3) high pixel variability, and (4) MAUP.

In the first instance, comparison of classification accuracies is difficult when using imagery of different resolutions. In the case of QuickBird this means comparing the classification of 2.8 meter original multispectral and 0.7 meter pan-sharpened imagery. Classification accuracy is resolution dependent and no single resolution is ideal for all land cover classes [Marceau and Hay, 1999; Huiping et al., 2003]. As a result, we would expect to see accuracy improvement in some classes while degradation in others. This does not allow for a meaningful basis of comparison.

Secondly, the spectral integrity of UNB Pan-Sharpened imagery is relatively unproven. Although visually convincing and mathematically rigorous, we must establish the suitability of the spectral properties of pan-sharpened imagery to the classification task. This remains difficult to perform without first controlling the effects of different resolutions. For example, if the classification accuracy of a given land cover class is worse using pan-sharpened imagery, it is difficult to deduce if the degradation should be attributed to the resolution difference or lack of spectral integrity.

Thirdly, traditional pixel-based classification techniques have an inherent difficulty dealing with the high information content resulting from the high spatial resolution of modern satellite sensors. This problem is further emphasized when classifying pan-sharpened multispectral imagery as a result of the increased spectral variability over the original multispectral data. Often this difficulty becomes apparent in the so-called salt and pepper effect of the classified image.

Finally, and most importantly, the pixel-based approach does not address the modifiable areal unit problem.

Segmentation is the division of an image into "its constituent parts and extracting these parts of interest (objects)" [Zhang, 1996]. The algorithms by which segmentation is carried out have been the focus of significant research in the past two decades [Zhang, 1997; Carleer et al., 2004]. Using the object-oriented approach, only a successfully segmented image will lead to a convincing classification. In general, these algorithms can be classed into two distinct categories: boundary-based and region-based [Gonzalez and Woods, 1992; Janssen et al., 1995; Zhang, 1997; Carleer et al., 2004]. Boundary-based algorithms depend on the detection of contours through discontinuity in gray levels within the image. On the other hand, region-based algorithms associate pixels with similar characteristics into contiguous regions [Zhang, 1997; Carleer et al., 2004]. Regardless of the category, many segmentation algorithms rely on user selected parameters to perform the segmentation. The appropriate selection of these "parameters (thresholds) is very important and has a great influence on the segmentation results" [Carleer et al., 2004].

Control of the segmentation process can be classed as image-driven or knowledge-driven depending on the method by which the segmentation parameters are determined [Guindon, 1997; Definiens Imaging GmbH, 2004b]. Image-driven segmentation, also called "bottom-up control", begins at the pixel level and extracts contiguous objects across the entire image based on image features. Knowledge-driven segmentation, or top-down as it is also known, relies on the establishment of a model by which to extract corresponding objects. Both systems have their own advantages and disadvantages.

Many segmentation algorithms require some degree of user input for the segmentation of an image. For example, in image segmentation using a thresholding technique, the user must determine the appropriate threshold in order to achieve the best results for a given application. Consequently, a common approach to determine these parameters is trial and error until a satisfactory result is achieved. Further compounding this problem is a vague understanding of what result constitutes 'satisfactory' segmentation and how best to measure it [Zhang, 1997]. Unfortunately, without a systematic form of segmentation control, trial and error is inherently a very time-consuming process, especially when the analyst continues to apply this approach without a clear definition as to when he should cease his efforts.

Definiens Imaging GmbH's eCognition software employs an object-oriented approach for the classification of land cover. eCognition accomplishes this by using a "Region-Merging" technique [Darwish et al., 2003; Carleer et al., 2004] called "Fractal Net Evolution" to extract image object-primitives in varying resolutions [Baatz and Schape, 1999]. Classification of meaningful image object-primitives instead of pixels separates eCognition from most other commercial classification approaches. Through multiresolution segmentation followed by the application of a fuzzy rule base for classification, eCognition has been designed to overcome the challenges associated with the classification of textured data that is characteristic of modern VHR sensors. In one embodiment, the technology of this application uses eCognition version 4.0 for the object-oriented land cover classification task.

Classification of meaningful image objects, instead of pixels, separates object-oriented classification from most other classification approaches. The grouping of pixels together to form image objects is carried out in the preliminary segmentation stage. The result from the segmentation process is an image divided into a number of contiguous regions that serve as "building blocks and information carriers for subsequent classification" [Definiens Imaging GmbH, 2004b].

As the user selected segmentation parameters vary, the resulting objects will change. After each segmentation is complete, it remains the user's responsibility to determine what the resulting objects represent. When working with a new data set, it is common for the initial extracted objects to have very little meaning. For example, an object representing a patch of grass in a large grass sports field has little significance. These objects are more aptly called object primitives. Therefore, a distinction is made between objects and object primitives. The goal of segmentation in a subsequent step should be merge object primitives together into meaningful image objects. In this example, a meaningful object would be one object that represents the entire sports field. In this way, the spectral and spatial properties of the object in the classification stage can be used to advantage.

It is impractical to expect that all objects will exactly represent the land cover objects as perceived by the user (image objects). Although it should be the goal of the user to extract these objects from the imagery, a realistic expectation is the extraction of object primitives that are as meaningful as possible. In this application, reference is made to all objects as image objects with the understanding that meaningful image object primitives are the practical realization of this goal. In other words, the extracted objects may not exactly represent the actual land cover objects as perceived by the user, but are as close as possible using the segmentation routine and will therefore be referred to as image objects.

"Segmentation of non-trivial images is one of the most difficult tasks in image processing" and remains the focus of significant research [Gonzalez and Woods, 2002]. Segmentation approaches can be classed as either boundary-based or region-based [Gonzalez and Woods, 1992; Janssen et Molenaar, 1995; Zhang, 1997; Carleer et al., 2004].

Boundary-based algorithms rely on discontinuity detection techniques to extract the structure of image objects. One of the simplest methods to accomplish this task in the spatial domain is the use of a spatial mask for edge detection. Employing a first order derivative approach, the Prewitt and Sobel operators are among the most popular but suffer from their sensitivity to noise within the image [Gonzalez and Woods, 2002]. The second order derivative, implemented through the Laplacian mask is even more sensitive to noise and for this reason it is often implemented after a smoothing filter. Once edge detection is complete, the image must be post-processed to close the pertinent objects while reducing the edge effects due to noise and other spurious results which often appear in highly textured data [Gonzalez and Woods, 2002]. For this reason, discontinuity based techniques are less than ideal for VHR satellite imagery with a characteristically high spectral variance.

Region-based algorithms associate pixels with similar characteristics into contiguous regions [Zhang, 1997; Carleer et al., 2004]. Thresholding remains one of the most straightforward region-based segmentation techniques. In its simplest form, a threshold (i.e. gray value) is selected based on trial and error or through an analysis of the image histogram by the user or specified algorithm. Examining the entire image histogram to determine the threshold is a global operation that aims to separate regions based solely on gray level. In a more sophisticated form, thresholding can be performed by taking into consideration local properties (local thresholding) and pixel locations within the image (adaptive thresholding) [Gonzalez and Woods, 2002]. Although these techniques are relatively easy to implement and can be applied to multispectral imagery, more sophisticated techniques such as region growing and region merging offer further promise in terms of their robustness and applicability across a variety of data sets.

Region growing refers to a procedure that starts with a number of "seed" points and through the definition of similarity criteria, regions are formed by grouping similar pixels to the associated "seeds" [Gonzalez and Woods, 2002]. Region merging works in a similar fashion, but focuses on merging groups of pixels that have been previously created by some method [Gonzalez and Woods, 2002]. If one considers single pixels as the regions from which to start, the two methods cannot be distinguished.

In the most general case, n regions extracted from the image R through a region merging routine must satisfy the following criteria [Gonzalez and Woods, 2002]:

(a) $\bigcup_{i=1}^{n} R_i = R$ (b) $R_i$ is a connected region, where i=1, 2, ..., n.
(c) $R_i \cap R_j = \emptyset$ for all i and j, i≠j.
(d) $P(R_i)$=TRUE for i=1, 2, ..., n, where P(Ri) is a logical predicate.
(e) $P(R_i \cup R_j)$=FALSE for any adjacent regions $R_i$ and $R_j$.

In this instance, a connected region refers to a region whose pixels are, according to some definition, related as neighbors. In addition, the predicate P(Rk) is the condition that is applied to all the pixels that comprise the region Rk. For a region merging routine, this predicate is normally a condition of similarity in some sense.

Starting at the pixel level with single pixel regions and merging these regions to form meaningful image objects requires the definition of a stopping criteria [Baatz and Schape, 2000; Gonzalez and Woods, 2002]. Problems arise when the stopping rule relies solely on local characteristics of the objects and do not take the region merging history into account. To overcome this shortfall, additional criteria that consider size and shape of the resulting objects add considerable effectiveness to this approach, but rely on some degree of a priori knowledge of the objects of interest [Gonzalez and Woods, 2002]. The region-based approach to segmentation is used in eCognition.

Combining the "fractal structure of the world and of semantics with object orientation", Definiens Imaging designed and implemented a region merging approach to segmentation called 'Fractal Net Evolution' [Baatz and Schape, 1999]. This technique was designed with the view to meeting six aims including the [Baatz and Schape, 2000]:

(a) Production of homogeneous image object-primitives;
(b) Adaptability to different scales;
(c) Production of similar segment sizes for a chosen scale;
(d) Applicability to a variety of data sets;
(e) Reproducibility of segmentation results; and
(f) Requirement for reasonably fast performance.

Using the basic concept of region merging, accomplishment of the first aim outlined above, required the establishment of a logical predicate condition to evaluate whether or not to merge two adjacent image objects. The resulting condition was a definition of the degree of fitting between two objects based on homogeneity criteria.

To determine the degree of fitting, eCognition focuses on two distinct features: (1) spectral heterogeneity change, $h_{spectral}$, and (2) shape heterogeneity change, $h_{shape}$. [Baatz and Schape, 2000; Definiens Imaging GmbH, 2004b]. The overall spectral heterogeneity change, $h_{spectral}$, is a measure of the object heterogeneity difference (similarity in feature space) resulting from the potential merge of two adjacent objects (obj1 and obj2) and is given by [Definiens Imaging GmbH, 2004b]:

$$h_{spectral} = \sum_c w_c (n_{Obj1+Obj2} \cdot \sigma_c^{Obj1+Obj2} - (n_{Obj1} \cdot \sigma_c^{Obj1} + n_{Obj2} \cdot \sigma_c^{Obj2})) \quad (3.1)$$

where c represents the different raster layers, we are the weights associated with each layer, n is the number of pixels comprising the objects, and $\sigma_c$ is the standard deviation of pixel values within each layer. On the other hand, the overall shape heterogeneity change, $h_{shape}$, is the weighted average of compactness heterogeneity change, $h_{compact}$, and smoothness heterogeneity change, $h_{smooth}$, as given by [Definiens Imaging GmbH, 2004b]:

$$h_{shape} = w_{compact} \cdot h_{compact} + (1 - w_{compact}) \cdot h_{smooth} \quad (3.2)$$

where $w_{compact}$ is the weight associated with the compactness heterogeneity change. Conceptually, the most compact form describes a circle while the most smooth form describes a rectangle. Compactness heterogeneity change, $h_{compact}$, is defined as [Definiens Imaging GmbH, 2004b]:

$$h_{compact} = n_{Obj1+Obj2} \cdot \frac{l_{Obj1+Obj2}}{\sqrt{n_{Obj1+Obj2}}} - \left( n_{Obj1} \cdot \frac{l_{Obj1}}{\sqrt{n_{Obj1}}} + n_{Obj2} \cdot \frac{l_{Obj2}}{\sqrt{n_{Obj2}}} \right) \quad (3.3)$$

where n is the number of pixels comprising the objects and l is the perimeter of the objects. Smoothness heterogeneity change is defined as [Definiens Imaging GmbH, 2004b]:

$$h_{smooth} = n_{Obj1+Obj2} \cdot \frac{l_{Obj1+Obj2}}{b_{Obj1+Obj2}} - \left( n_{Obj1} \cdot \frac{l_{Obj1}}{b_{Obj1}} + n_{Obj2} \cdot \frac{l_{Obj2}}{b_{Obj2}} \right) \quad (3.4)$$

where n is the number of pixels comprising the objects, l is the perimeter of the objects, and b is the perimeter of the object's bounding box.

Together, $h_{spectral}$ and $h_{shape}$ quantities evaluate to a single value that is indicative of the overall heterogeneity change for the potential merge of two objects. This overall value is the so-called 'fusion' value. The fusion value, f, for the potential merge between two objects is given by [Definiens Imaging GmbH, 2004b]:

$$f = w \cdot h_{spectral} + (1-w) \cdot h_{shape} \quad (3.5)$$

where w is the user assigned weight associated with spectral heterogeneity change. The merge between two objects will be considered if the fusion value falls below the square of a user specified threshold referred to as the "scale parameter". The relationships between these quantities are graphically represented in FIG. 1.

In the context of this calculation, it is the user's responsibility to select all of the weighting elements and the scale factor. Ultimately the weights determine the heterogeneity change and the scale factor is compared to the fusion value to establish the stopping criteria. The sums of the weights are always normalized such that their sum is one. In this way, the sums of the weighted heterogeneity change quantities provide the weighted average in each case.

The above discussion outlines how the region merging similarity condition is met through the fusion value and the scale parameter. There is further requirement, however, to provide a decision mechanism in the event that more than one object satisfies the similarity condition. For example, take the case of four objects as shown in FIG. 2. If we start with Object A, and determine that both Object B and Object D meet the similarity criteria, we must have a method to determine which merge is the optimal choice.

In eCognition, this problem is addressed through an optimization procedure that aims to minimize the overall heterogeneity change. In our example, the merge of Object A and B provides the minimum change. At this point, the optimization routine looks to Object B as the starting point and determines which object merge provides the minimal heterogeneity change. If Object A is identified as the optimal choice, the merge proceeds since the two objects are mutually the best choice. If another object, for example Object C, is the optimal choice for the merge with Object B, then the optimization routine looks to Object C as the starting point to find the object that provides the minimal heterogeneity change. The process continues in this fashion, following the gradient of homogeneity within the image until mutually best fitting objects can be found [Baatz and Schape, 2000].

The scale parameter is an adjustable quantity designed to meet the second segmentation aim outlined above. Scale in this context refers to the degree of object abstraction. As a result, the scale parameter in eCognition is simply a threshold value limiting the degree of object abstraction by monitoring the degree of heterogeneity change as objects iteratively merge. Consequently, as the scale parameter increases the region merging algorithm will permit more merges and the regions grow larger. While scale refers to the degree of object abstraction, size refers to the actual physical dimension of the object. Therefore, in eCognition there is a distinct difference between scale and size, although they are closely related in the context of this procedure. The stopping criterion is met when there are no longer any merges that satisfy the threshold established by scale parameter.

By employing an evenly distributed treatment order over the entire image, regions grow at a similar rate across the image. More homogenous regions will tend to grow larger as would be expected from our definition of heterogeneity as discussed above. In general, however, the regions can be described as similar in size for any user-defined scale, achieving the third segmentation aim above.

Employing the object-oriented approach, eCognition is able to take advantage of a diverse array of features for classification based on tone, texture, size, shape, and context [Definiens Imaging GmbH, 2004a]. eCognition employs these features in a classification scheme based on fuzzy logic, which provides the user with a powerful tool to manage the inherent complexities that arise using the object-based approach.

Each class in the classification hierarchy is described by one or more fuzzy sets. Fuzzy sets are built using features and user-defined membership functions. In this way, membership functions map feature values to the interval 0 to 1. For example, the class 'water' can be described by an object's low mean value in the near infrared (NIR) band. For this application, the assumption is made that this class can be defined sufficiently using only this one condition. Therefore, to define this class, a membership function must be defined to describe the fuzzy set Low_NIR such that Low_NIR: Mean_NIR_Band→[0,1]. Since this is the only condition, the following rule can be formulated:

$$\mu_{water}(object) = \mu_{Low\_NIR}(Mean\_NIR\_Band(object)) \quad (3.6)$$

where each object will be assigned a membership value to the class 'water' that is equal to the membership of the object to the fuzzy set Low_NIR through the feature Mean_NIR_Band.

In the case where more complex class descriptions are required, membership functions can be combined through fuzzy operators. For example, assume that a lake can be described as being composed of water and having a very compact shape. Combining the conditions, a rule can be created to describe membership to the class 'lake' according to:

$$\mu_{lake}(object) = [\mu_{Low\_NIR}(Mean\_NIR\_Band(object)) \cap \mu_{Compact}(Compactness(object))] \quad (3.7)$$

where the membership to the class 'lake' is the minimum of the object's membership to fuzzy set Low_NIR and fuzzy set Compact.

Since the class descriptions (rules) are organized within a classification hierarchy, complex rules can be simplified. Using results from classification on a previous level of the hierarchy, such as the classification of class 'water', this result can be used for the classification of class 'lake'. Through this approach, equation (3.7) becomes:

$$\mu_{lake}(object) = [\mu_{water}(object) \cap \mu_{Compact}(Compactness(object))]. \quad (3.8)$$

This simplifies the situation considerably, and the result is a hierarchical classification knowledge base.

This fuzzy methodology permits objects to partially belong to any class. In the end, however, the defuzzification process evaluates the highest membership value for a particular object and assigns the object to the appropriate class. In other words, the result is a classification of each object as would be expected from any other conventional form of classification with each object assigned to a land cover type, the only difference being that an object may have partial membership to other classes as well.

For very complicated class descriptions requiring the use of numerous object features, the membership function approach does not work well and can be handled much better using a nearest neighbor approach in multidimensional feature space [Definiens Imaging GmbH, 2004b]. Nearest neighbor works in a similar manner to the minimum distance supervised classification technique which is common to the pixel-based approach. The overall implementation is simplified using the case of a segmented image since training areas are simply the objects themselves, each object containing a number of representative pixels. Once the samples have been identified, all remaining objects in the image are assigned the same class as the closest training object in feature space.

Lillesand and Keifer [1994] note that the minimum distance classifier is generally not used on data with high variance due to problems separating the classes in multispectral space. Using objects, however, there are two distinct advantages over the minimum distance classifier as conventionally applied to pixels in multispectral space: (1) high multispectral variability is managed well through the use of image objects, and (2) features available to the user through the use of objects instead of pixels promises better overall separation in feature space than in multispectral space.

Since eCognition is based on a fuzzy classification scheme, the nearest neighbor classifier must also associate a fuzzy membership value to each class in the hierarchy. To accomplish this, the membership value is calculated as a function of distance in feature space between the object being classified and the nearest training object for each class. Therefore, in the context of the resulting classification knowledge base it does not matter which technique is employed (nearest neighbor or membership function) since they both generate a fuzzy classification result.

SUMMARY

According to one aspect of the invention, there is provided a use of a fuzzy logic inference system to calculate segmentation parameters for segmenting a digital image.

According to another aspect of the invention, there is provided a method of segmenting a digital image comprising the steps of (a) performing a preliminary segmentation of the image into sub objects; (b) defining a model object by selecting sub objects that define the model object; (c) providing sub-object and model object features; (d) using a fuzzy logic inference system to calculate segmentation parameters based on at least one of the sub object and model object features; and (e) performing segmentation of the image using the segmentation parameters.

According to another aspect of the invention, there is provided a method of segmenting an image comprising the steps of: (a) performing a preliminary segmentation; (b) providing input segmentation parameters; (c) using a fuzzy logic inference system using the input segmentation parameters and object features to evaluate new segmentation parameters; and (d) performing segmentation of the image using the new parameters.

According to another aspect of the invention, there is provided a method of calculating segmentation parameters for segmenting an initially segmented digital image comprising the steps of: (a) defining a model object by selecting sub objects that define the model object; (b) providing sub-object and model object features; and (c) using a fuzzy logic inference system to calculate segmentation parameters based on at least one of the sub object features and the model object features.

According to another aspect of the invention, there is provided a computer readable memory having recorded thereon statements and instructions for execution by a computer to carry out a method of segmenting a digital image comprising the steps of (a) performing a preliminary segmentation of the image into sub objects; (b) defining a model object by selecting sub objects that define the model object; (c) providing sub-object and model object features; (d) using a fuzzy logic inference system to calculate segmentation parameters based on at least one of the sub object and model object features; and (e) performing segmentation of the image using the segmentation parameters.

According to another aspect of the invention, there is provided a computer readable memory having recorded thereon statements and instructions for execution by a computer to carry out a method of segmenting an image comprising the steps of: (a) performing a preliminary segmentation; (b) providing initial input segmentation parameters; (c) using a fuzzy logic inference system using the initial input segmentation parameters and object features to evaluate new segmentation parameters; and (d) performing segmentation of the image using the new parameters.

According to another aspect of the invention, there is provided a computer readable memory having recorded thereon statements and instructions for execution by a computer to carry out a method of calculating segmentation parameters for segmenting an initially segmented digital image comprising the steps of: (a) defining a model object by selecting sub objects that define the model object; (b) providing sub-object and model object features; and (c) using a fuzzy logic inference system to calculate segmentation parameters based on at least one of the sub object features and the model object features.

In another aspect of the invention there is provided a system for segmenting a digital image comprising: a fuzzy logic inference system configured to define a model object by selecting sub-objects that define a model object, calculate segmentation parameters based on at least one sub object and model object feature, and calculate segmentation parameters based on at least one of the sub object features and the model object features.

Other aspects and features of the present invention will become apparent to those ordinarily skilled in the art upon review of the following description of specific embodiments of a method and system for image segmentation in conjunction with the accompanying drawing figures.

BRIEF DESCRIPTION OF THE DRAWINGS

Embodiments of the present invention will now be described, by way of example only, with reference to the accompanying drawing figures, wherein.

DETAILED DESCRIPTION OF THE DRAWINGS

Figure 1:
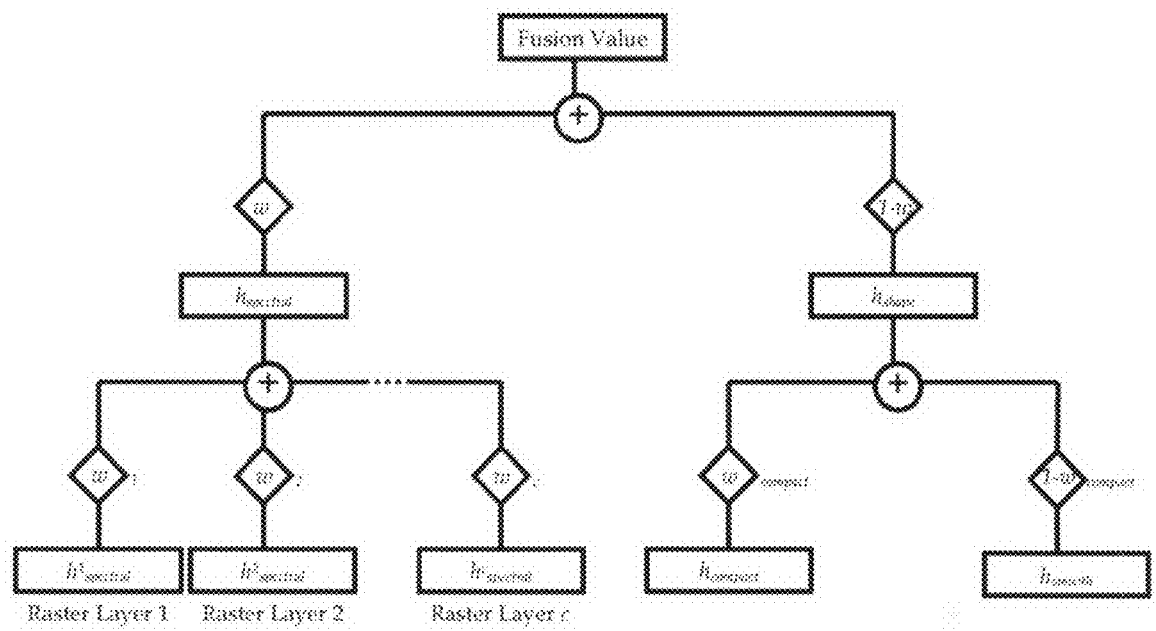
FIG. 1 is a graphical representation of the composition of a fusion value criterion used by prior art eCognition software.
Figure 2:
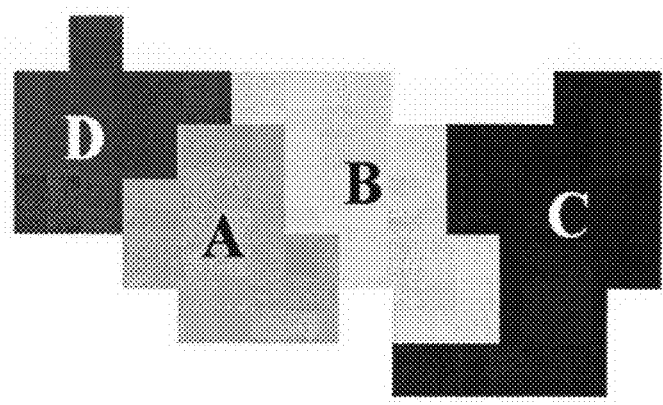
FIG. 2 is an illustration of four prior art image objects.
Figure 3:
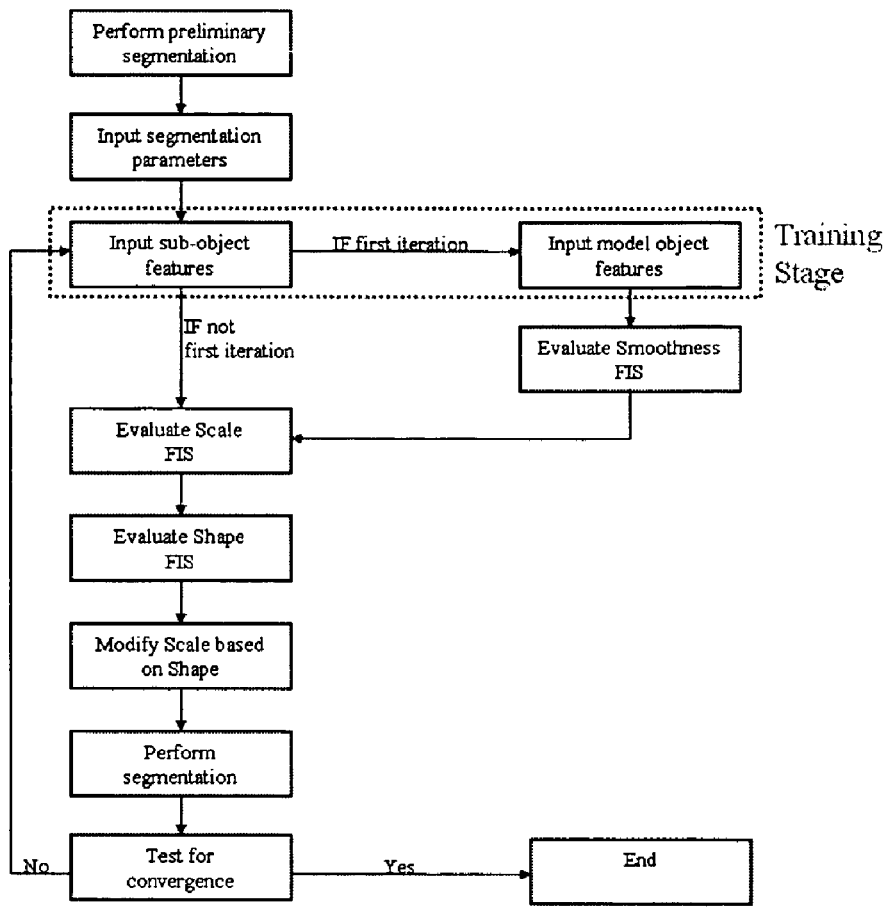
FIG. 3 is a flow diagram of a method according to the invention.

Referring to FIG. 3, the start state is an initial segmentation of the input image. This segmentation should be conducted using a small scale parameter with little or no weight given to the shape parameter. This approach produces an over segmented image with the emphasis on spectrally homogeneous objects. In this manner small details in the image, and more importantly the land cover object of interest, are retained.

Once complete, the user must select the sub-objects (SO) that form the model object (MO) being extracted. During the first iteration, the union of all sub-objects will exactly define the model. This is the ideal case, but as the region merging routine progresses, this may cease to be true. A threshold must be established to determine the point at which a sub-object ceases to be considered part of the model-object. This is easily accomplished by ensuring a minimum fractional area of each sub-object falls inside the model object. In this manner, the set M of sub-objects m that form the model object can be formalized by:

$$M = \{m \mid [\text{area}(m \cap MO)/\text{area}(m)] > T\} \text{ for all } m \in I \quad (5.9)$$

where T specifies the fractional area threshold, and I denotes the entire image. However, if at any point MO is completely inside one sub-object, then that sub-object will be the only object comprising the set M.

Using this definition for the sub-objects that form the model object, the user must input the current segmentation parameters, sub-object (SO) features, and model object (MO) features into the system (the definition of these features will be discussed in detail later). The system uses the SO features to evaluate the current segmentation status and compare these results to the desired final segmentation state described by the MO features. This comparison is conceptually based on discrepancy evaluation of image object quality. By using object feature discrepancy, smoothness, scale, and shape parameters can be estimated, each using their unique fuzzy inference system (FIS) to perform this operation. Due to the interrelationship between scale and shape, the estimated scale parameter is further modified as a function of the estimated shape parameter. This is necessary since the FIS features that describe scale are purely dependent on the spectral properties of the object, yet scale is a function of both spectral and shape characteristics. Finally, segmentation is performed using the estimated parameters and convergence to the model object solution is tested based on feature discrepancy measures. If not yet converged, the system will continue to iterate to a solution. Therefore, convergence will only be achieved once the result is of suitable quality as determined through feature discrepancy measures between the sub-object and model object based on scale and size comparison at each iteration.

This workflow was implemented using Matlab and the Fuzzy Logic Toolbox extension.

The first step in applying a fuzzy control structure to this problem requires the definition of input variables. In this application, the variables are SO features that are representative of the current status of the segmentation process. In turn, these features will be used to guide the process to its successful completion. Selection of the appropriate features requires an in-depth understanding of the region-merging routine used by eCognition. Definition of these features for each FIS is discussed below.

Region-merging in eCognition is based upon the notion that the "average heterogeneity of image objects weighted by their size should be minimized" [Definiens Imaging GmbH, 2004b]. Although heterogeneity change is a function of both spectral and shape properties, the effect of the latter on the overall heterogeneity calculation cannot be determined since it is not estimated when the scale parameter is determined. For this reason, and to ensure that the scale parameter is as large as possible, the initial estimate of the scale parameter is based solely on the spectral properties of the sub-objects in the initial segmentation. The spectral information is the primary information in the image and the initial segmentation is based almost entirely on spectral information.

Referring to equation 3.1, spectral heterogeneity change, $h_{spectral}$, is a function of individual spectral band weights, wc. To ensure simplicity of the system is not compromised, the weight of each band is set to unity. With these simplifications made to reduce the inherent complexity of the scale parameter, feature definition for the scale FIS can be carried out.

Spectral variance (texture) is the primary tool used to measure spectral heterogeneity. Within a user defined model object, texture can be described by the internal texture of each sub-object (pixel variance) as well as the texture resulting from the different spectral mean between sub-objects. Therefore, two fuzzy input variables are defined for the scale parameter FIS: (1) mean object texture, Texture, and (2) object stability, Stability. Texture establishes the internal sub-object feature and Stability establishes the external sub-object feature. Together, they are used to estimate the current segmentation status as well as the final desired segmentation state.

Texture, in this application, is a feature defined by:

$$\text{Texture}(m \text{ objects}) = \frac{1}{n_{merge}} \sum_m \left[ n_{obj_m} \cdot \frac{1}{c} \sum_c \sigma_c^{obj_m} \right] \quad (5.10)$$

where $\sigma_c^{obj_m}$ is the standard deviation of object m in spectral layer c, c is the number of spectral layers, $n_{obj_m}$ is the number of pixels comprising object m, m represents the number of sub-objects comprising the model object, and $n_{merge}$ is the number of pixels in the resulting merged object. Understanding that spectral variance is an important value in the calculation of $h_{spectral}$, and that spectral variance continues to grow with the size of the objects, this feature is a key indicator in determining the current state of segmentation.

Stability feature defines the spectral similarity between objects. Sub-objects that are spectrally homogeneous internally may be very different from each other. The greater the spectral difference between the sub-objects, the higher the scale will have to be to merge them. To ensure an appropriate definition for the Stability feature, eCognition's built-in Mean_Difference_to_Neighbors feature is applied as defined by [Definiens Imaging GmbH, 2004b]:

$$\Delta s_c^{obj_m} = \frac{1}{l} \cdot \sum_p [l_s^{obj_p} \cdot |\bar{s}_c^{obj_m} - \bar{s}_c^{obj_p}|] \quad (5.11)$$

where $\bar{s}_c^{obj_m}$ is the spectral mean value of layer c for the object of interest, $\bar{s}_c^{obj_p}$ is the spectral mean value of layer c of direct neighbour object p, p represents the number of objects that are direct neighbours to the object of interest, l is the border length of the object of interest, and $l_s^{obj_p}$ is the length of shared border between object of interest and direct neighbour object p. Using this feature a Stability feature can be defined to evaluate the similarity of each sub-object m to its neighbour objects. Stability in this application is defined as:

$$\text{Stability}(m \text{ objects}) = \frac{1}{m}\sum_m \left[\frac{1}{c}\sum_c \Delta s_c^{obj_m}\right] \quad (5.12)$$

where m represents the number of sub-objects.

Figure 4:
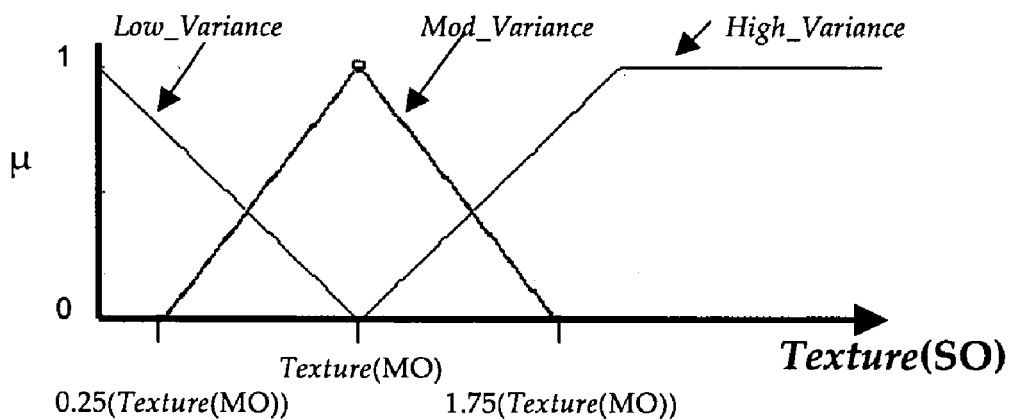
FIG. 4 is a graph of Texture feature membership functions according to the invention.
Figure 5:
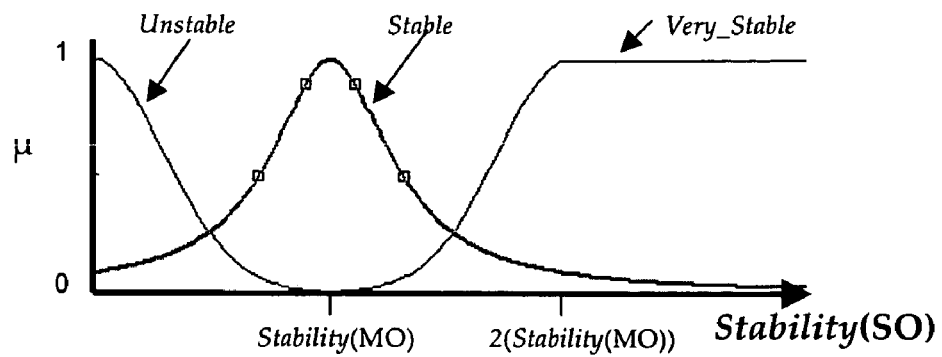
FIG. 5 is a graph of Stability feature membership functions according to the invention.

The Texture and Stability features defined above are applied to the sub-objects comprising the model object to evaluate the current segmentation status of the system. Using the same features and applying them to the model object can measure the segmentation state that we want to achieve. In doing so, these MO feature values play an important role in defining the membership functions. The shape of each membership function is a result of empirically evaluated success of the system. Therefore, if the system needs to be adjusted to produce better estimates for the scale parameter, the membership function can simply be modified until the FIS produces improved results. Both Texture and Stability membership functions are graphically defined in FIGS. 4 and 5.

With membership functions defined, the rules forming the rule base are formed. The rules for the scale FIS as proposed in this research are:

(a) $\mu_{Increase} = [\mu_{Low\_Variance}(\text{Texture(SO)}) \cap \mu_{Unstable}(\text{Stability(SO)})]$ (b) $\mu_{Increase} = [\mu_{Low\_Variance}(\text{Texture(SO)}) \cap \mu_{Stable}(\text{Stability(SO)})]$ (c) $\mu_{Increase} = [\mu_{Mod\_Variance}(\text{Texture(SO)}) \cap \mu_{Unstable}(\text{Stability(SO)})]$ (d) $\mu_{Maintain} = [\mu_{Low\_Variance}(\text{Texture(SO)}) \cap \mu_{Very\_Stable}(\text{Stability(SO)})]$ (e) $\mu_{Maintain} = [\mu_{Mod\_Variance}(\text{Texture(SO)}) \cap \mu_{Stable}(\text{Stability(SO)})]$ (f) $\mu_{Maintain} = [\mu_{High\_Variance}(\text{Texture(SO)}) \cap \mu_{Unstable}(\text{Stability(SO)})]$ (g) $\mu_{Reduce} = [\mu_{Mod\_Variance}(\text{Texture(SO)}) \cap \mu_{Very\_Stable}(\text{Stability(SO)})]$ (h) $\mu_{Reduce} = [\mu_{High\_Variance}(\text{Texture(SO)}) \cap \mu_{Stable}(\text{Stability(SO)})]$ (i) $\mu_{Reduce} = [\mu_{High\_Variance}(\text{Texture(SO)}) \cap \mu_{Very\_Stable}(\text{Stability(SO)})]$ During successive iterations, the singletons that compose the three output membership functions (Increase, Maintain, and Reduce) are shifted. Since the singletons do not move during the iteration they are considered zero order functions (constant). The three output membership functions are formally defined as:

(a) μReduce=Reduce(x);
(b) μMaintain=Maintain(y); and
(c) μIncrease=Increase(z).

In this case, x is defined as the scale from the previous iteration, y is the current scale, and z is a predicted scale. An element of history is ensured by using the previous scale to define $f_{Reduce}$ while a prediction is made as to the next scale according to:

$$z = 2y - x + \sqrt{n_{merge}} \cdot \sqrt{m} \quad (5.13)$$

where $n_{merge}$ is the number of pixels comprising the merged object and m is the number of sub-objects forming the model object.

The use of constant membership functions in output space instead of a modified fuzzy set permits aggregation and defuzzification to be completed in one step. In the scale FIS, this combined step is performed using a weighted average of x, y, and z where each value (location) is weighted by the membership value determined from the firing strength of each rule in the rule base. The result is a single scale value that is the estimate for the next iteration.

The balance between spectral and spatial information in the calculation of the scale parameter is a critical one. The spectral information should be weighted as much as possible, while using only as much shape information as necessary. This makes perfect sense since spectral information is the primary information in the image. However, as objects grow larger shape plays an increasingly important role. This is particularly true if one or more of the sub-objects that form the object of interest have significantly different spectral information. In this case, the region-merging routine may tend to merge with objects outside the object of interest if they are spectrally similar. To prevent this from happening, shape information becomes increasingly important to successful segmentation, but too much shape information and we lose our connection to the spectral information in the image. A correct balance must be determined to achieve a visually convincing result.

Three different features were defined to aid in the prediction of an appropriate shape parameter. The first two features focus on local properties. In other words, the properties of sub-objects as they relate to the model object. The primary reason for these features is to identify any particularly large spectral difference or size difference between the sub-objects. Such occurrences can have adverse effects on merging when relying only on spectral information as a result of the texture information they contain. The last feature focuses on a global property and emphasises the importance of sub-object absolute size to the determination of the shape parameter. The larger that sub-objects grow, the more important shape becomes. Together, these features determine the shape parameter that best suits the situation.

The first feature determines which sub-object, m, has the maximum spectral difference compared to the desired model object, M. The identified sub-object is then used to calculate the Spectral_Mean feature. This feature is particularly important for urban areas where problems often arise when one object (ie. air conditioning unit) may be particularly bright while the rest of the rooftop is dark. The larger the spectral difference between the one object and the average rooftop value, the more difficult it may be to merge the objects together based on spectral properties. Instead, maintaining the overall shape of the roof may play increased importance to achieve a satisfying result.

Given the set M, composed of m sub-objects, the subset of objects, A, which has the largest mean spectral difference as defined in this research is given by:

$$A = \left\{ a \mid a = m \text{ for all objects } m \in M \text{ where } \max\left\{\frac{1}{c}\sum_c |\bar{s}_c^{obj_m} - \bar{s}_c^{obj_M}|\right\} \text{ is True} \right\} \quad (5.14)$$

where $\bar{s}_c^{obj_m}$ is the spectral mean value of layer c for the sub-object of interest, $\bar{s}_c^{objM}$ is the spectral mean value of layer c for the model object, and c is the number of spectral layers. In all likelihood, the set A will contain a single object unless two or more objects are found with an identical maximum mean spectral difference. If this should happen, the object with the largest size should be selected. In any case, the object with the maximum mean spectral difference is used to determine the proposed Spectral_Mean feature given by:

$$\text{Spectral\_Mean}(m \text{ objects}) = \frac{1}{c}\sum_c \bar{s}_c^{obj_a} \text{ for object } a \in A. \quad (5.15)$$

The second feature assesses the size of the object identified in equation 5.5. This feature explores the size difference between sub-object a and the average sub-object size. This aids in determining the degree to which shape should be increased to successfully merge the sub-objects. If the air conditioning unit from the previous example is only small, then there is an increased chance that it will merge with the surrounding objects based on spectral properties. However, if it is large in size, then the texture change is large and may not merge well with surrounding objects based solely on spectral properties. In this case, shape takes on greater importance.

The fuzzy union operator, $\cup$, is used to describe both standard and non-standard union operations. The union operator is best described as a logical OR operation. The standard fuzzy union interpretation of OR is a maximum operation which results in the maximum value between two fuzzy sets. Assuming that fuzzy sets B and C are defined over the universal set A, the fuzzy union between B and C can be formalized by:

$$(B \cup C)(a) = \max[B(a), C(a)] \quad (5.5)$$

for all a∈A.

Size_Difference feature as proposed in this thesis is defined by:

$$\text{Size\_Difference}(m \text{ objects}) = \left|\left(\frac{1}{m}\sum_m n_{obj_m}\right) - n_{obj_a}\right| \quad (5.16)$$

where m is the number of objects forming the model object, $n_{obj_m}$ is the number of pixels comprising object m, and $n_{obj_a}$ is the number of pixels forming object a, where object a is the object that satisfies equation 5.14.

Finally, the global largest size feature is used to monitor the growth of sub-objects. In general, the larger an object grows the more shape is required to achieve a visually convincing result. The proposed Lg_Size feature is defined as:

$$\text{Lg\_Size}(m \text{ objects}) = \max\{n_{obj_m}\} \text{ for all objects } m \in M \quad (5.17)$$

where $n_{obj_m}$ is the number of pixels comprising object m.

Figure 6:
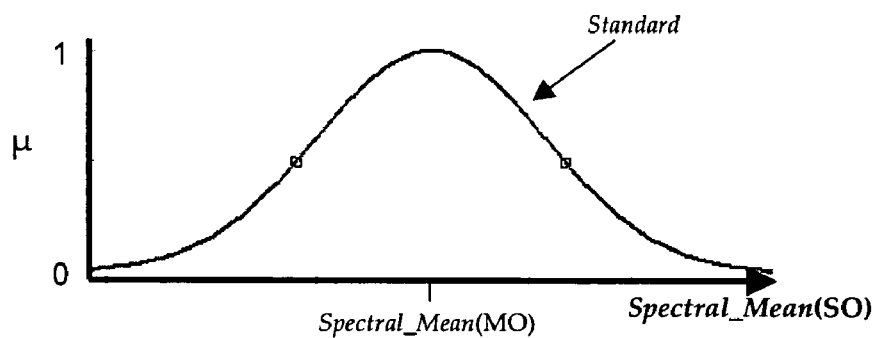
FIG. 6 is a graph of Spectral-Mean feature membership functions according to the invention.
Figure 7:
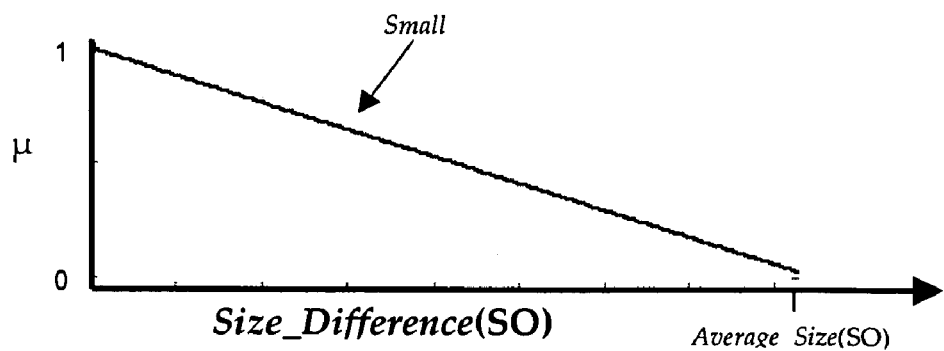
FIG. 7 is a graph of Size-Difference feature membership functions according to the invention.
Figure 8:
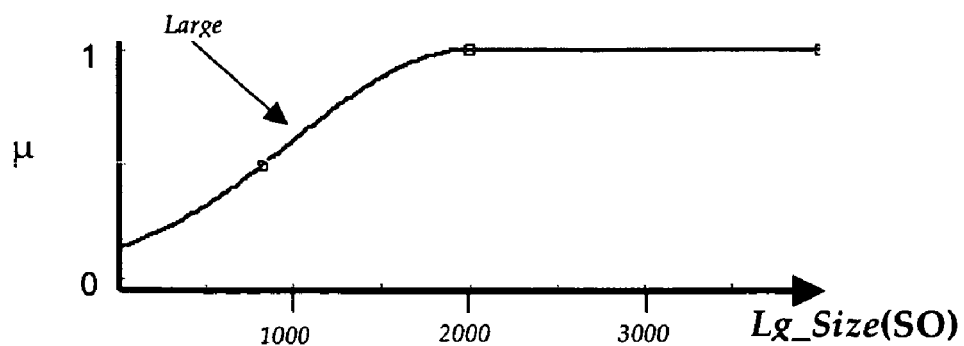
FIG. 8 is a graph of Lg-Size feature membership functions according to the invention.

The membership functions comprising the above features are graphically shown in FIGS. 6 through 8.

In this instance, there is only one membership function defined for each feature. By using the logical NOT or compliment operation, we can create other membership functions without defining them outright. With these membership functions defined, the rules forming the rule base are created. The rules for the shape FIS are:

(a) $\mu_{Less} = [\mu_{Standard}(\text{Spectral\_Mean}(SO)) \underset{prod}{\cap} \mu_{Small}(\text{Size\_Difference}(SO))]$ (b) $\mu_{Average} = [\mu_{\neg Standard}(\text{Spectral\_Mean}(SO)) \underset{prod}{\cap} \mu_{\neg Small}(\text{Size\_Difference}(SO))]$ (c) $\mu_{More} = [\mu_{Large}(\text{Lg\_Size}(SO))]$ The singletons that compose the three output membership functions (More, Average, and Less) remain constant at all times since the universe of discourse for the shape parameter is limited to the interval [0,0.9]. The maximum value for shape is 0.9 because at least part of the heterogeneity criteria has to come from the image itself (ie. spectral information). The singletons were balanced in the output space occupying positions of 0.1, 0.5, and 0.9 ensuring at least a little of both shape or spectral criteria in the calculation of heterogeneity change, even at the extremes. The three output membership functions are defined as:

(a) μLess=Less(0.1);
(b) μAverage=Average(0.5); and
(c) μMore=More(0.9).

For the shape FIS, aggregation and defuzzification is carried out by means of a weighted average once again. Defuzzification is not so apparent in this case since the result is fuzzy itself and is used directly as a weight parameter in the calculation of the heterogeneity.

As the importance of shape increases, the smoothness parameter grows in importance since smoothness and compactness describe the shape of an object. If the emphasis is placed on object compactness, then objects are more likely to merge if they form a compact shape as a result of the reduced heterogeneity change in the object merge. As a result, the tendency will be to grow compact objects.

Different from the spectral versus shape relationship, compactness versus smoothness are not mutually exclusive terms. An object can be both compact and smooth. The smoothness parameter simply identifies which is the most important to user by permitting the selection of this weighting element.

According to the workflow in FIG. 3, the smoothness FIS is evaluated only once and the parameter is left unchanged throughout for the duration of the remaining iterations. The reason for this is that the shape properties of the model object constitute the only important factor to the determination of the smoothness parameter. If the model object is compact, then the emphasis should be placed on compactness. The model object does not change and so the weight value associated to compactness does not change either. The parameter that does change is the overall shape parameter, and this will affect the compactness of the objects that result. Therefore, the smoothness parameter is calculated only once and its importance is modified for each iteration using the shape parameter.

From equation 3.3, a compact object conceptually describes a circle with compactness increasing as the radius increases. When dealing with pixels, however, the ideal compact object becomes a square due to the difficulty synthesising a circular form from square pieces. From equation 3.4, an ideal smooth object is formed by a rectangle. Using these two equations, features can be identified that describe these different forms and in this way, determine which description is most important to achieving the model object form.

Smoothness is described using a black-box eCognition feature called Rectangular Fit. This feature creates a rectangle of the same area and length-to-width ratio as the object being rated. Once complete, the rectangle is fit to the object and the object area outside the rectangle is compared to the object area inside [Definiens Imaging GmbH, 2004b]. The fit is then described with a value between 0 (no fit) and 1 (perfect fit) and constitutes the Rect_Fit feature that will be employed in this FIS.

Compactness is more easily defined using the ratio of the object perimeter to the object area. This feature is defined identically to the definition of compactness used by eCognition for segmentation. The Compact feature is defined mathematically as:

$$\text{Compact}(MO) = \frac{l}{\sqrt{n_{obj_M}}} \quad (5.18)$$

where l is the model object's border length and $n_{obj_M}$ is the number of pixels (area) of the model object.

Figure 9:
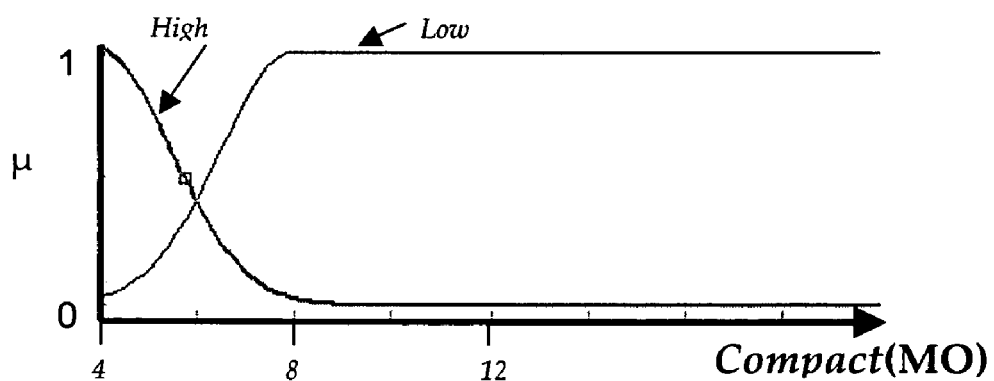
FIG. 9 is a Compact feature membership function according to the invention.
Figure 10:
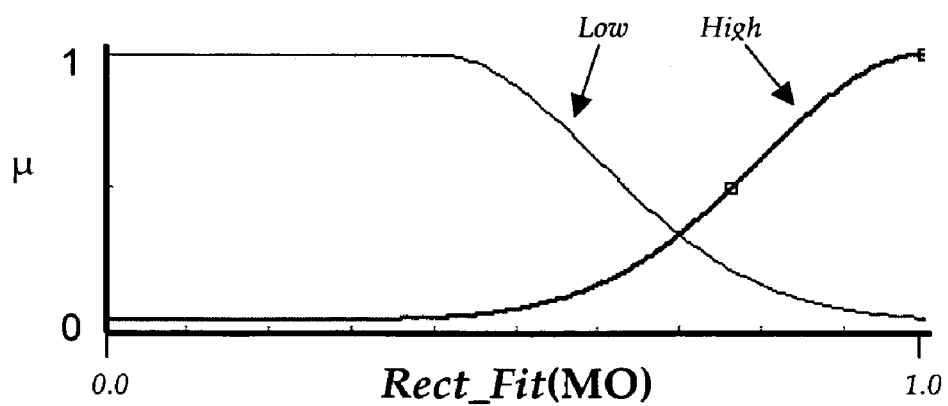
FIG. 10 is a Rect-Fit feature membership function according to the invention.
Figure 11:
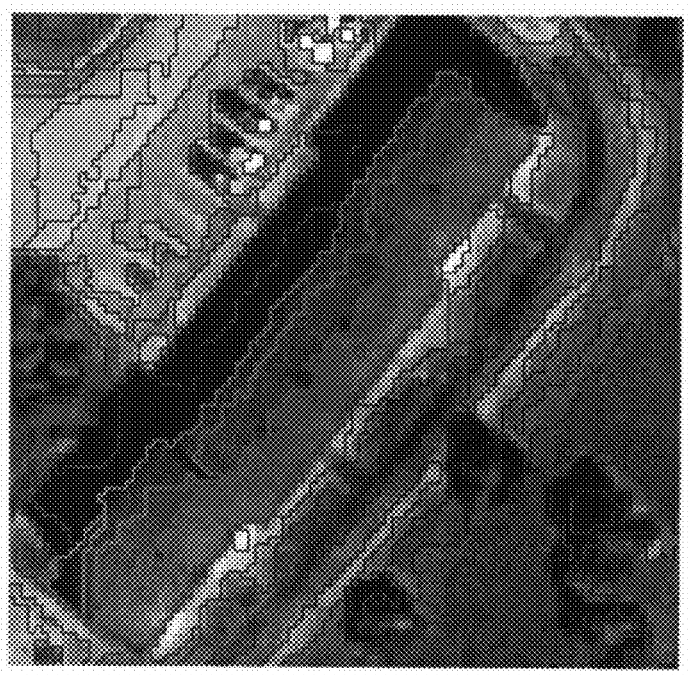
FIG. 11 is a digital image of an initial segmentation of a high contrast building.
Figure 12:
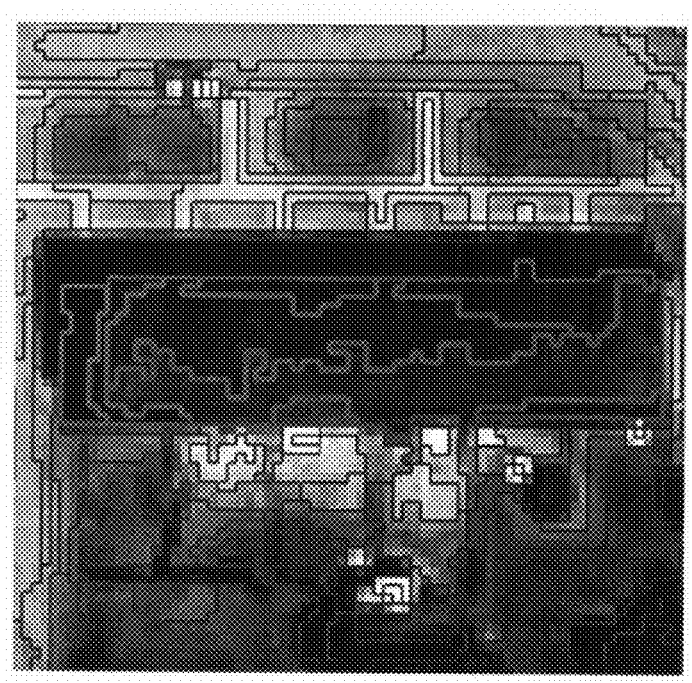
FIG. 12 is an initial segmentation of a low contrast building.
Figure 13:
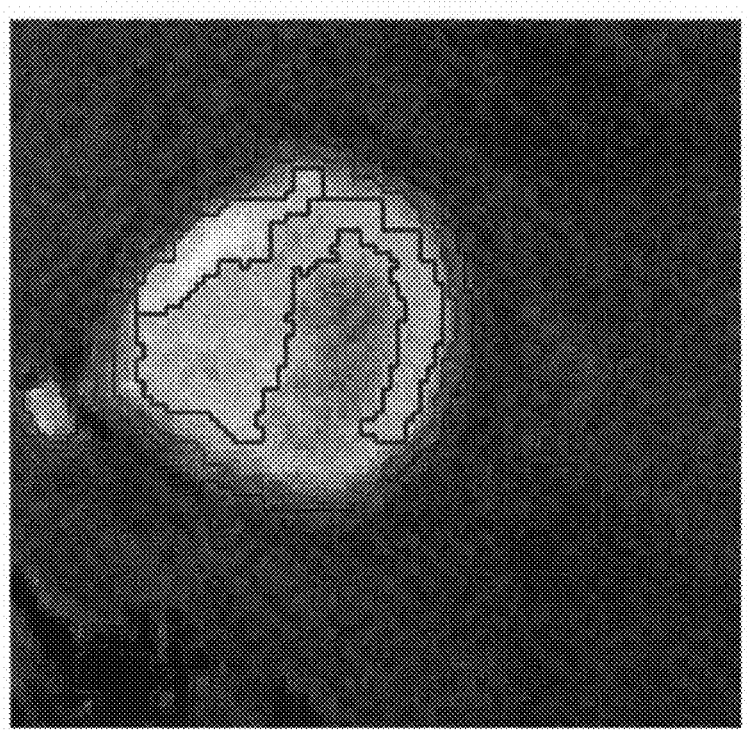
FIG. 13 is an initial segmentation of a baseball diamond.
Figure 14:
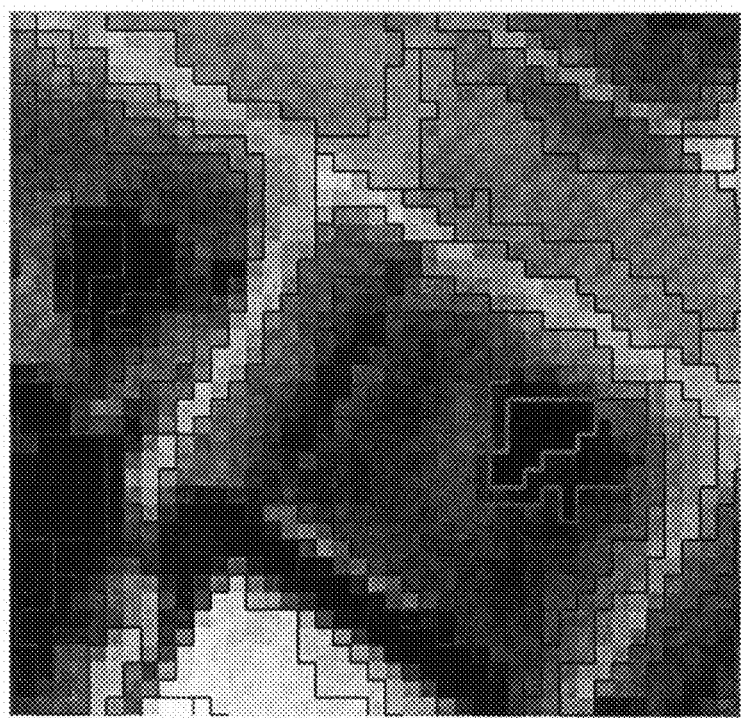
FIG. 14 is an initial segmentation of a tree.

The membership functions comprising the above features are graphically shown in FIGS. 9 and 10. Independent membership functions add to the flexibility of the overall system. This was particularly important in this FIS since objects can be both smooth and compact. Using the compliment, a change in one membership function results in a change in the others, but with this approach, the membership functions could be modified independently. This demonstrated reasonable results in this FIS.

The rules for this FIS are:
 (a) $\mu_{Increase}=[\mu_{High}(\text{Rect\_Fit}(MO))\cap\mu_{Low}(\text{Compact}(MO))]$
 (b) $\mu_{Maintain}=[\mu_{High}(\text{Rect\_Fit}(MO))\cap\mu_{High}(\text{Compact}(MO))]$
 (c) $\mu_{Decrease}=[\mu_{Low}(\text{Rect\_Fit}(MO))\cap\mu_{High}(\text{Compact}(MO))]$
 (d) $\mu_{Decrease}=[\mu_{Low}(\text{Rect\_Fit}(MO))\cap\mu_{Low}(\text{Compact}(MO))]$ The singletons that compose the three output membership functions (Increase, Maintain, and Decrease) remain constant at all times since the universe of discourse for smoothness is limited to the interval between 0 and 1. Through experience with the software and as a result of the literature review, it was decided that compactness on the order of 0.2 is an average value and exhibits reasonable results. Therefore, the three output membership functions are defined as:
 (a) μDecrease=Decrease(0.0);
 (b) μMaintain=Maintain(0.2); and
 (c) μIncrease=Increase(1.0).

For the smoothness FIS, aggregation and defuzzification are carried out the same way as with all previous FISs. A weighted average of each singleton in output space is assessed and the defuzzified result is used to guide segmentation to its successful conclusion.

Previously, two features were defined based on object spectral properties to guide the selection of an appropriate scale parameter. In reality, the fusion value is a function of both shape and spectral properties. The rate of change of $h_{shape}$ with respect to object size, however, is much larger than the rate of change of $h_{spectral}$. The resultant scale value calculated in the scale FIS is appropriate for a fusion value calculated solely on the basis of spectral properties, but with part of the fusion value based on shape, the objects grow too quickly and soon become too large.

To resolve this problem, the scale value must be modified to account for the shape parameter determined in the shape FIS. This modification is defined by:

$$\text{Modified Scale Parameter} = (1-w)\cdot\text{Scale} \quad (5.19)$$

where Scale is the parameter determined in the scale FIS, and w is the shape parameter determined in the shape FIS.

Segmentation is carried out using the three primary segmentation parameters as determined in each FIS. Once completed, the convergence to the model object is evaluated based on the change in scale from the last iteration and the difference between model object and sub-object size. If these values fall under a specified threshold, the system is considered to have converged and the segmentation process is terminated.

Using Pan-Sharpened data, the implementation of the tool of the present application focused on four separate land cover objects, each with their own unique attributes. The four land cover objects included (FIGS. 11 through 14): (1) a high contrast building; (2) a low contrast building with shadow; (3) a ball diamond; and (4) a tree. Each land cover object is shown with its initial segmentation completed. The sub-objects making up the model object are highlighted in red.

In the initial segmentation, the objects of interest are oversegmented. The parameters for this initial segmentation are user selected, but ensure that the emphasis is placed on the spectral properties of the objects during this initial segmentation. The resulting sub-objects are small and spectrally homogeneous, retaining the detail of each object of interest intact. For example, the corners of the buildings are well defined in FIGS. 11 and 12, the shadow can be separated from the low contrast building in FIG. 12, the turf is separate from the soil in the FIG. 13, and the tree is distinctly separated from the surrounding grass in FIG. 14. The parameters for these initial segmentations are shown in Tables 1 through 4 as the first iteration.

TABLE 1

Figure 15:
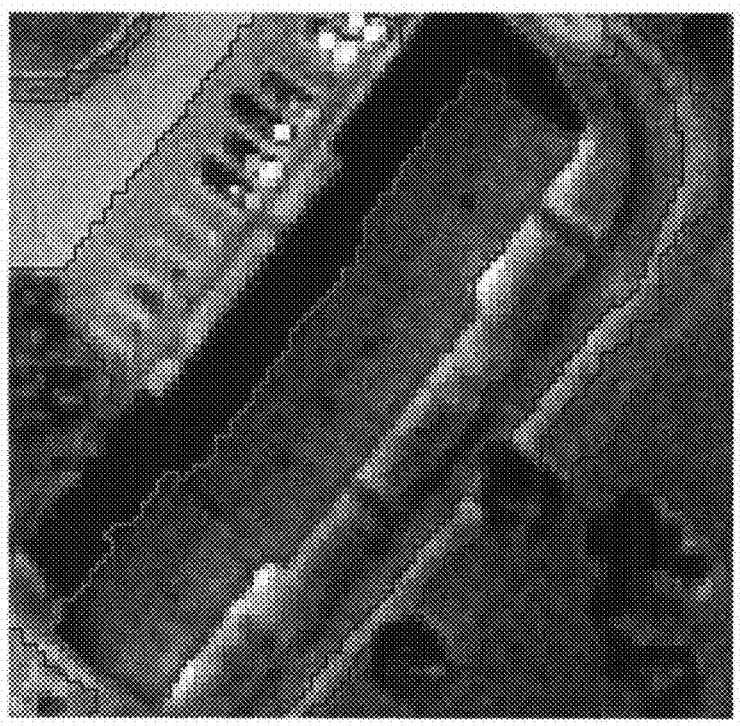
FIG. 15 is an extraction of a high contrast building in four iterations.

Segmentation parameters for object in FIG. 15

| | Iteration | | | |
|---|---|---|---|---|
| Parameter | 1 | 2 | 3 | 4 |
| Number of sub-objects | 6 | 2 | 2 | 1 |
| Scale | 25 | 52 | 85 | 120 |
| Shape | 0.1 | 0.723 | 0.410 | 0.410 |
| Smoothness | 0.1 | 0.868 | 0.868 | 0.868 |

TABLE 2

Figure 16:
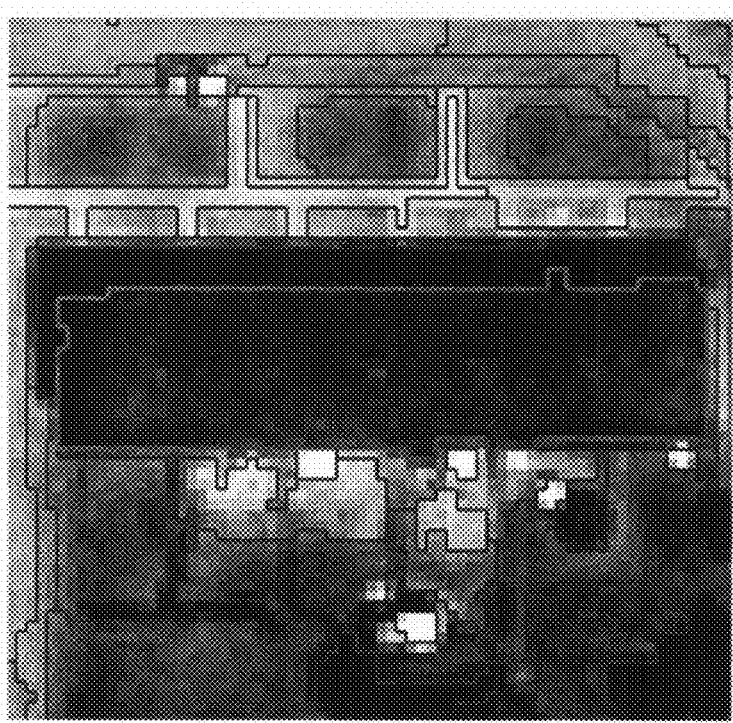
FIG. 16 is an extraction of a low contrast building in four iterations.

Segmentation parameters for object in FIG. 16

| | Iteration | | | |
|---|---|---|---|---|
| Parameter | 1 | 2 | 3 | 4 |
| Number of sub-objects | 8 | 1 | 1 | 1 |
| Scale | 20 | 54 | 40 | 32 |
| Shape | 0.1 | 0.585 | 0.511 | 0.533 |
| Smoothness | 0.1 | 0.399 | 0.399 | 0.399 |

TABLE 3

Figure 17:
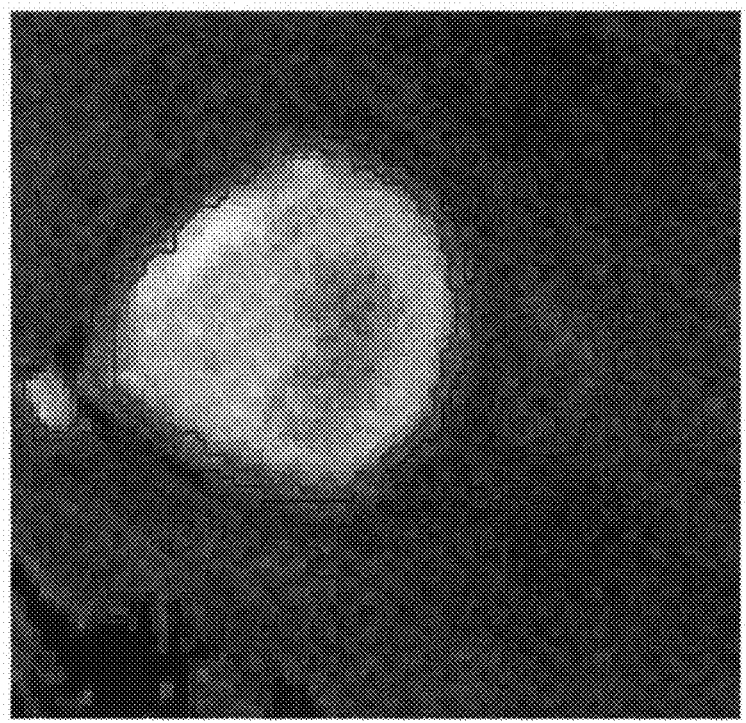
FIG. 17 is an extraction of a baseball diamond in two iterations.

Segmentation parameters for object in FIG. 17

| | Iteration | |
|---|---|---|
| Parameter | 1 | 2 |
| Number of sub-objects | 3 | 1 |
| Scale | 50 | 76 |
| Shape | 0.1 | 0.621 |

TABLE 3-continued

Segmentation parameters for object in FIG. 17

| Parameter | Iteration 1 | Iteration 2 |
|---|---|---|
| Smoothness | 0.1 | 0.248 |

TABLE 4

Figure 18:
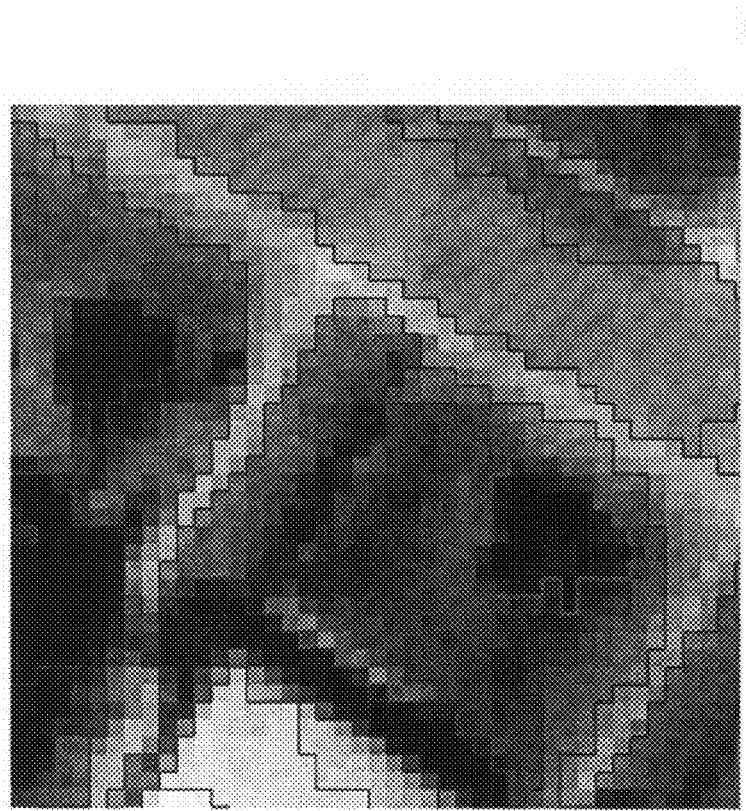
FIG. 18 is an extraction of a tree in two iterations.

Segmentation parameters for object in FIG. 18

| Parameter | Iteration 1 | Iteration 2 |
|---|---|---|
| Number of sub-objects | 3 | 1 |
| Scale | 15 | 29 |
| Shape | 0.1 | 0.236 |
| Smoothness | 0.1 | 0.335 |

Once the initial segmentation is complete, employing the fuzzy segmentation parameter selection tool to perform the segmentation achieves very good results with relatively few iterations. To extract a specific land cover type, the user must simply select the objects that form the land cover object of interest. This step is the training stage and once complete, the selection of parameters and evaluation of subsequent iterations is performed automatically using the FISs discussed previously. The methodology simulates human decision making in an automated fashion, saving the user time, while not requiring a great deal of previous experience using the software.

With the exception of the first iteration where the user must estimate the initial segmentation parameters, the parameters selected by the proposed tool are consolidated in Tables 1 through 4. These results are shown in FIGS. 15 through 18.

REFERENCES

Aplin, P., P. M. Atkinson, and P. J. Curran (1999). "Fine Spatial Resolution Simulated Satellite Sensor Imagery for Land Cover Mapping in the United Kingdom." Remote Sensing of Environment, Vol. 68, No. 3, pp. 206-216. [Internet], cited 20 Oct. 2004. Available in .pdf format through http://www.unb.ca/eresources/e-Journals.php Baatz, M. and A. Schape (1999). "Object-Oriented and Multi-Scale Image Analysis in Semantic Networks." Proceedings of the 2nd International Symposium on Operationalization of Remote Sensing, ITC, NL, 16-20 August. [Internet], cited 2 Jul. 2004. Available in .pdf format through http://www.definiens-imaging.com/documents/reference.htm Baatz, M. and A. Schape (2000). "Multiresolution Segmentation—An Optimization Approach For High Quality Multi-Scale Image Segmentation." Angewandte Geographische Informationsverarbeitung XII, Ed. J. Strobl et al. AGIT Symposium, Salzburg, Germany, 2000. pp. 12-23. [Internet], cited 2 Jul. 2004. Available in .pdf format through http://www.definiens-imaging.com/documents/reference.htm Bauer, T. and K. Steinnocher (2001). "Per-parcel land use classification in urban areas applying a rule-based technique." Geobit/GIS. Vol. 6, pp. 24-27. [Internet], cited 24 Aug. 2004. Available in .pdf format through http://www.definiens-imaging.com/documents/reference.htm Blaschke T. and J. Strobl (2001). "What's Wrong with Pixels? Some. Recent Developments Interfacing Remote Sensing and GIS." GeoBIT/GIS, Vol. 6, pp. 12-17. [Internet], cited 24 Aug. 2004. Available in .pdf format through http://www.definiens-imaging.com/documents/reference.htm Burnett, C. and T. Blaschke (2003). "A Multi-Scale Segmentation/Object Relationship Modelling Methodology For Landscape Analysis." Ecological Modelling, Vol. 168, pp. 233-249. [Internet], cited 4 Jun. 2004. Available in .pdf format through http://www.unb.ca/eresources/e-Journals.php Carleer, A., O. Debeir, and E. Wolff (2004). "Comparison of Very High Spatial Resolution Satellite Image Segmentations." Proceedings of SPIE: Image and Signal Processing for Remote Sensing IX, Ed. L. Bruzzone. Barcelona, Spain, 2004. SPIE Vol. 5238, Bellingham, Wash., pp. 532-542.

Cheng, P., T. Toutin, and Y. Zhang (2003). Technical Papers. [Internet], cited 30 Oct. 2004. Available in .pdf format through http://www.pcigeomatica.com/support_center/tech_papers/techpapers_main.php Congalton, R. G., and K. Green (1999). Assessing the Accuracy of Remotely Sensed Data: Principles and Practices. Lewis Publishers, NY.

Cushnie, J. L. (1987). "The Interactive Effect of Spatial Resolution and Degree of Internal Variability Within Landcover Types on Classification Accuracies." International Journal of Remote Sensing, Vol. 8, No. 1, pp. 15-29.

Davis, C. H. and X. Wang (2002). "Urban Land Cover Classification from High Resolution Multi-Spectral IKONOS Imagery." Proceedings of IGARSS 2002 IEEE. Institute of Electrical and Electronic Engineers Inc, Toronto, Canada, July 2003. University of Waterloo. [Internet], cited 4 Jun. 2004. Available in .pdf format through http://www.definiens-imaging.com/documents/reference.htm Darwish, A., K. Leukert, and W. Reinhardt (2003). "Image Segmentation for the Purpose of Object-Based Classification." Proceedings of IGARSS 2003 IEEE. Institute of Electrical and Electronic Engineers Inc, Toulouse, France, July 2003. University of Bundeswehr, Munich, Germany. [Internet], cited 4 Jun. 2004. Available in .pdf format through http://www.definiens-imaging.com/documents/reference.htm De Kok, R, T. Schneider, and U. Ammer (1999). "Object-based classification and Applications I the alpine forest environment." Proceedings of the International Archives of Photogrammetry and Remote Sensing, Vol. 32, Part 7-4-3. Valladolid, Spain, 3-4 Jun. 1999. [Internet], cited 22 Feb. 2005. Available in .pdf format through http://www.definiens-imaging.com/documents/reference.htm De Kok, R., A. Buck, T. Schneider, and U. Ammer (2000). "Analysis of Image Objects from VHR Imagery for Forest GIS Updating in the Bavarian Alps." ISPRS, Vol. XXXIII. Amsterdam, 2000. [Internet], cited 24 Aug. 2004. Available in .pdf format through http://www.definiens-imaging.com/documents/reference.htm Definiens Imaging GmbH (2004a). Whitepaper—eCognition Professional 4.0. Definiens Imaging, GmbH, Munich, Germany. [Internet], cited 30 May 2004. Available in .pdf format through http://www.definiens-imaging.com/documents/brochures.htm Definiens Imaging GmbH (2004b). eCognition User Guide 4. Definiens Imaging, GmbH, Munich, Germany.

DigitalGlobe (2004). "QuickBird Specifications." [Internet], cited 18 Aug. 2004. Available at http://www.digitalglobe.com/about/QuickBird.html DigitalGlobe (2005). "General Questions." [Internet], cited 27 Jan. 2005. Available at http://www.digitalglobe.com/about/FAQ.shtml#q3

Ehlers, M., R. Janowsky, M. Gohler (2003). "Ultra High Resolution Remote Sensing for Environmental Monitoring." Earth Observation Magazine [Internet], (December 2003), cited 20 Jan. 2005. Available at www.eomonline.com/Archives/Dec03/Ehlers.html Flack, J. (1996). Interpretation of Remotely Sensed Data using Guided Techniques. Ph.D. thesis, School of Computer Science, Curtin University of Technology, Western Australia.

Flanders, D., M. Hall-Beyer, J. Pereverzoff (2003). "Preliminary evaluation of eCognition object-based software for cut block delineation and feature extraction." Canadian Journal of Remote Sensing, Vol. 29, No. 4, pp. 441-452. [Internet], cited 4 Jun. 2004. Available in .pdf format through http://www.unb.ca/eresources/e-Journals.php Frauman, E. and E. Wolff (2005). "Segmentation of very high spatial resolution satellite images in urban areas for segments-based classification." Human Settlements and Impact Analyisis, Proceedings of the ISPRS Working Group VII. Tempe, Ariz., USA, 14-16 Mar. 2005. [Internet], cited 1 May 2005. Available in .pdf format through http://www.definiens-imaging.com/documents/reference.htm Genderon, J. L. Van, and C. Pohl (1994). "Image fusion: Issues, Techniques, and Applications." Intelligent Image Fusion, Proceedings EARSeL Workshop, Eds. J. L. Van Genderon and V. Cappellini. Strasbourg, France, 11 Sep. 1994, pp. 18-26.

Gonzalez, R. and R. Woods (1992). Digital Image Processing. Addison-Wesley, Reading, Mass.

Gonzalez, R. and R. Woods (2002). Digital Image Processing: Second Edition. Prentice-Hall, Inc., Upper Saddle River, N.J.

Guindon, B (1997). "Computer-Based Aerial Image Understanding: A Review and Assessment of its Application to Planimetric Information Extraction from Very High Resolution Satellite Images." Canadian Journal of Remote Sensing, Vol. 23, pp. 38-47. [Internet], cited 20 Jan. 2005. Available in .pdf format through http://www.ccrs.nrcan.gc.ca/ccrs/rd/apps/map/infoext_e.html Hay, G., T. Blaschke, D. Marceau, A. Bouchard (2003). "A Comparison of Three Image-Object Methods for the Multiscale Analysis of Landscape Structure." ISPRS Journal of Photogrammetry and Remote Sensing, Vol. 57, No. 5-6, pp. 327-345. [Internet], cited 27 Sep. 2004. Available in .pdf format through http://www.unb.ca/eresources/e-Journals.php Hofmann, P. and W. Reinhardt (2000). "The Extraction of GIS Features from High Resolution Imagery using Advanced Methods based on Additional Contextural Information—First Experiences." International Archives of Photogrammetry and Remote Sensing. Amsterdam, 2000, pp. 51-58. [Internet], cited 24 Aug. 2004. Available in .pdf format through http://www.definiens-imaging.com/documents/reference.htm Hofmann, P (2001). "Detecting Urban Features from IKONOS Data using an Object-Oriented Approach." Proceedings of the First Annual Conference of the Remote Sensing & Photogrammetry Society. RSPS, Munich, Germany, 12-14 Sep. 2001, pp. 79-91. [Internet], cited 24 Aug. 2004. Available in .pdf format through http://www.definiens-imaging.com/documents/reference.htm Huiping, H., W. Bingfang, and F. Jinlong (2003). "Analysis to the Relationship of Classification Accuracy, Segmentation Scale, Image Resolution." Proceedings of IGARSS 2003 IEEE. Institute of Electrical and Electronic Engineers Inc, Toulouse, France, July 2003, pp. 3671-3673. [Internet], cited 24 Aug. 2004. Available in .pdf format through http://www.definiens-imaging.com/documents/reference.htm Janssen, L. L. F. and M. Molenaar (1995). "Terrain Objects, Their Dynamics and Their Monitoring by the Integration of GIS and Remote Sensing." IEEE Transactions on Geoscience and Remote Sensing, Vol. 33, No. 3, pp. 749-758. [Internet], cited 20 Oct. 2004. Available in .pdf format through http://www.unb.ca/eresources/e-Journals.php Kaehler, S (1998). "Fuzzy Logic—An Introduction." [Internet], cited 12 Oct. 2004. Available at http://www.seattlerobotics.org/encoder/mar98/fuz/flindex.html Klir, G. J., U. H. St. Clair, and B. Yuan (1997). Fuzzy Set Theory: Foundations and Applications. Prentice-Hall Inc., Upper Saddle River, N.J.

Latty, R. S. and R. M. Hoffer (1981). "Computer-Based Classification Accuracy Due to the Spatial Resolution Using Per-Point Versus Per-Field Classification Techniques." Symposium of Machine Processing of Remotely Sensed Data, pp. 384-392.

Lillesand, T. and R. Kiefer (1994). Remote Sensing and Image Interprestation. 3rd ed., John Wiley and Sons, Inc., New York.

Marceau, D. J. (1999). "The Scale Issue in the Social and Natural Sciences." Canadian Journal of Remote Sensing. Vol. 25, No. 4, pp. 347-356.

Marceau, D. J. and G. J. Hay (1999). "Remote Sensing Contributions to the Scale Issue." Canadian journal of Remote Sensing. Vol. 25, No. 4, pp. 357-366.

Markham, B. L. and J. R. G. Townshend (1981). "Land Cover Classification Accuracy as a Function of Sensor Spatial Resolution." Proceeding of the Fifteenth International Symposium on Remote Sensing of Environment, Ann Arbor, Mich., pp. 1075-1090.

Matsuyama, T (1987). "Knowledge-Based Aerial Image Understanding Systems and Expert Systems for Image Processing", IEEE Transactions on Geoscience and Remote Sensing, Vol. 25, pp. 305-316.

Meinel, G., M. Neubert, and J. Reder (2001). "The Potential Use of Very High Resolution Satellite Data For Urban Areas—First Experiences with IKONOS Data, their Classification and Application in Urban Planning and Environmental Monitoring." Proceedings of the 2nd Symposium on Remote Sensing of Urban Areas, Ed. C. Jurgens. Regensburg, Germany, pp. 196-205. [Internet], cited 24 Aug. 2004. Available in .pdf format through http://www.definiens-imaging.com/documents/reference.htm Munechika, C. K., J. S. Warnick, C. Salvaggio, and J. R. Schott (1993). "Resolution Enhancement of Multispectral Image Data to Improve Classification Accuracy." Photogrammetric Engineering and Remote Sensing, Vol. 59, No. 1, pp. 67-72.

Neubert, M (2001). "Segment-based Analysis of High Resolution Satellite and Laser Scanning Data." Proceedings of the 15th International Symposium Informatics for Environmental Protection—Sustainability in the Information Society, Eds. L. M. Hilty and P. W. Gilgen. Marburg, Metropolis, 10-12 October, 2001, pp. 379-386. [Internet], cited 24 Aug. 2004. Available in .pdf format through http://www.definiens-imaging.com/documents/reference.htm Neubert, M. and G. Meinel (2003). "Evaluation of Segmentation Programs for High Resolution Remote Sensing Applications." Proceedings of the ISPRS Joint Workshop High Resolution Mapping from Space. Hannover, Germany, 2003. [Internet], cited 24 Aug. 2004. Available in .pdf format through http://www.definiens-imaging.com/documents/reference.htm Office of Science and Technology Policy (2005). "U.S. Commercial Remote Sensing Policy, Apr. 25, 2003: Fact Sheet." [Internet], cited 24 Jan. 2005. Available at http://www.ostp.gov/html/Fact%20Sheet%20-%20Commercial%20Remote%20Sensing%20Policy%20-%20April%2025%202003.pdf Openshaw, S. and P. J. Taylor (1979). "A Million or So Correlation Coefficients: Three Experiments on the Modifiable Areal Unit Problem." Statistical Applications in the Spatial Sciences, pp. 127-144.

OrbImage (2005). "ORBIMAGE Selected as NGA's Second NextView Provider." [Internet], cited 24 Jan. 2005. Available at http://www.orbimage.com/news/releases/09-30A-04.html Pohl, C. and J. L. Van Genderen (1998). "Multisensor Image Fusion In Remote Sensing: Concepts, Methods And Applications." International Journal of Remote Sensing, Vol. 19, No. 5, pp. 823-854. [Internet], cited 21 Oct. 2004. Available in .pdf format through http://www.unb.ca/eresources/e-Journals.php Schiewe, J., L. Tufte, and M. Ehlers (2001). "Potential and Problems of Multi-Scale Segmentation Methods in Remote Sensing." GeoBIT/GIS, Vol. 6, pp. 34-39. [Internet], cited 24 Aug. 2004. Available in .pdf format through http://www.definiens-imaging.com/documents/reference.htm Schiewe, J (2002). "Segmentation of High-Resolution Remotely Sensed Data—Concepts, Applications, and Problems." Joint International Symposium on Geospatial Theory, Processing, and Applications. Ottawa, Canada. [Internet], cited 24 Aug. 2004. Available in .pdf format through http://www.definiens-imaging.com/documents/reference.htm Shackelford, A. and C. Davis (2003). "A fuzzy classification approach for high-resolution multispectral data over urban areas." IEEE Transactions of Geoscience and Remote Sensing. Vol. 41, No. 9, pp. 1920-1932. [Internet], cited 21 Oct. 2004. Available in .pdf format through http://www.unb.ca/eresources/e-Journals.php Space Imaging (2004). "IKONOS." [Internet], cited 18 Aug. 2004. Available at http://www.spaceimaging.com/products/ikonos/index_2.htm The Mathworks (2005). "Fuzzy Logic Toolbox—for use with MATLAB." [Internet], cited 15 Apr. 2005. Available in .pdf format through http://www.mathworks.com/access/helpdesk/help/pdf_doc/fuzzy/fuzzy.pdf Wong T. H., S. B. Mansor, M. R. Mispan, N. Ahmad, and W. N. A Sulaiman (2003). "Feature Extraction Based on Object Oriented Analysis." Proceedings of ATC 2003 Conference, Malaysia, 2004. [Internet], cited 24 Aug. 2004. Available in .pdf format through http://www.definiens-imaging.com/documents/reference.htm Zhang, Y. J. (1996). "A Survey on Evaluation Methods for Image Segmentation." Pattern Recognition. Vol. 29, No. 8, pp. 1335-1346. [Internet], cited 15 Oct. 2004. Available in .pdf format through http://www.unb.ca/eresources/e-Journals.php Zhang, Y. J. (1997). "Evaluation and Comparison of Different Segmentation Algorithms." Pattern Recognition Letters. Vol. 18, No. 10, pp. 963-974. [Internet], cited 21 Oct. 2004. Available in .pdf format through http://www.unb.ca/eresources/e-Journals.php Zhang, Y. (2002). "A New Automatic Approach for Effectively Fusing Landsat 7 Images and IKONOS Images." Proceedings of IGARSS 2002 IEEE. Toronto, Canada, 24-28 Jun. 2002. [Internet], cited 4 Jun. 2004. Available in .pdf format through http://www.unb.ca/eresources/e-Journals.php

BIBLIOGRAPHY

Barnes, S (2003). "Remote Sensing Unleashed." Geospatial Solutions [Internet], (1 Jun. 2003), cited January 2005. Available at http://www.geospatial-online.com/geospatialsolutions/issue/issueDetail.jsp?id=2325

Fuhr, J. N (2004). "GEOINT Visionary." Military Geospatial Technology Online Edition, Vol. 2, No. 3, pp. 17-19. [Internet], cited 24 Jan. 2005. Available in .pdf format through http://www.mgt-kmi.com/archive_article.cfm?DocID=628

Guobin, Z., B. Fuling, and Z. Mu (2003). "A Flexible Method for Urban Vegetation Cover Measurement based on Remote Sensing Images." Proceedings of the ISPRS Joint Workshop High Resolution Mapping from Space. Hannover, Germany, 2003. [Internet], cited 20 Aug. 2004. Available in .pdf format through http://www.definiens-imaging.com/documents/reference.htm National Geospatial-Intelligence Agency. "NGA Awards NextView Second Vendor Agreement." [Internet], cited 20 Jan. 2005. Available at http://www.nga.mil/NGASiteContent/StaticFiles/OCR/NextView20040930.pdf Zhang, Y. (2001). "Texture-Integrated Classification of Urban Treed Areas in High-Resolution Color-Infrared Imagery." Photogrammetric Engineering and Remote Sensing, Vol. 67, No. 12, pp. 1359-1365.

The invention claimed is:

1. A method comprising: using a fuzzy logic inference method to calculate segmentation parameters for segmenting a digital image into objects of the image.

2. The method according to claim 1 wherein the segmentation parameters are smoothness, scale and shape.

3. A method of segmenting a digital image comprising the steps of:
   (a) performing a preliminary segmentation of the image into sub-objects;
   (b) defining a model object by selecting sub-objects that define the model object;
   (c) providing sub-object and model object features;
   (d) using a fuzzy logic inference system to calculate segmentation parameters based on at least one of the sub-object and model object features; and
   (e) performing segmentation of the image using the segmentation parameters.

4. The method according to claim 3 wherein the segmentation parameters are smoothness, scale and shape.

5. The method according to claim 3 including repeating steps (b), (c) and (d).

6. The method according to claim 3 including the steps of:
   (f) setting a threshold for the point at which a sub-object ceases to be considered part of the model object;
   (g) performing a feature discrepancy measure between at least one of the sub-object features in the segmented image and at least one of the model object features for convergence; and
   (h) repeating step (d) if convergence is not achieved.

7. The method according to claim 6 wherein the feature discrepancy measure is based on scale and size of the objects.

8. The method according to claim 3 wherein the preliminary segmentation is performed using boundary-based image segmentation or region-based image segmentation.

9. The method according to claim 8 wherein the boundary-based image segmentation includes an optimal edge detection or watershed segmentation, and the region-based image segmentation includes a multilevel thresholding or a region-growing method.

10. The method according to claim 3 further including the step of:
(d) performing segmentation of the image using the segmentation parameters.

11. The method according to claim 10 further including the step of:
repeating step (c).

12. The method according to claim 11 further including the step of:
testing the image segmentation for convergence to the model object.

13. A non-transitory computer readable memory having recorded thereon statements and instructions for execution by a computer to carry out the method of claim 3.

14. A method of segmenting an image comprising the steps of:
(a) performing a preliminary segmentation;
(b) providing initial input segmentation parameters;
(c) using a fuzzy logic inference system using the initial input segmentation parameters and object features to evaluate new segmentation parameters; and
(d) performing segmentation of the image using the new parameters.

15. The method according to claim 14 including the step of:
(e) testing for convergence and repeating step (c).

16. The method according to claim 15 including the step of repeating step (d).

17. A non-transitory computer readable memory having recorded thereon statements and instructions for execution by a computer to carry out the method of claim 14.

18. A method of calculating segmentation parameters for segmenting an initially segmented digital image comprising the steps of:
(a) defining a model object by selecting sub-objects that define the model object;
(b) providing sub-object and model object features; and
(c) using a fuzzy logic inference system to calculate segmentation parameters based on at least one of the sub-object features and the model object features.

19. A non-transitory computer readable memory having recorded thereon statements and instructions for execution by a computer to carry out the method of claim 18.

20. A system for segmenting a digital image comprising:
a fuzzy logic inference system configured to define a model object by selecting sub-objects that define a model object, calculate segmentation parameters based on at least one sub-object and model object feature, and calculate segmentation parameters based on at least one of the sub-object features and the model object features.

21. A system for segmenting a digital image according to claim 20 comprising:
a segmentation module configured to segment the image using the segmentation parameters.

22. A system for segmenting a digital image according to claim 21 comprising:
a preliminary segmentation module configured to initially segment the image into sub-objects.

* * * * *